(12) United States Patent
Ibrahim et al.

(10) Patent No.: US 11,983,720 B2
(45) Date of Patent: May 14, 2024

(54) MIXED QUANTUM-CLASSICAL METHOD FOR FRAUD DETECTION WITH QUANTUM FEATURE SELECTION

(71) Applicant: International Business Machines Corporation, Armonk, NY (US)

(72) Inventors: Noel R Ibrahim, Oakville (CA); Voica Ana Maria Radescu, Reutlingen (DE); Michele Grossi, Brescia (IT); Constantin Harald Peter von Altrock, Bendorf (DE); Kirsten Muentner, Flieden (DE)

(73) Assignee: International Business Machines Corporation, Armonk, NY (US)

( * ) Notice: Subject to any disclaimer, the term of this patent is extended or adjusted under 35 U.S.C. 154(b) by 194 days.

(21) Appl. No.: 17/507,388

(22) Filed: Oct. 21, 2021

(65) Prior Publication Data
US 2023/0126764 A1    Apr. 27, 2023

(51) Int. Cl.
*G06Q 20/40* (2012.01)
*G06N 10/20* (2022.01)
(Continued)

(52) U.S. Cl.
CPC ......... *G06Q 20/4016* (2013.01); *G06N 10/20* (2022.01); *G06N 10/60* (2022.01); *G06N 20/10* (2019.01)

(58) Field of Classification Search
None
See application file for complete search history.

(56) References Cited

U.S. PATENT DOCUMENTS 10,318,881 B2    6/2019  Rose et al.
10,339,466 B1*   7/2019  Ding ............. G06N 20/00
(Continued)

OTHER PUBLICATIONS

Orus, Roman et al, "Quantum computing for finance: Overview and prospects", Reviews in Physics, Feb. 12, 2019, pp. 1-12. (Year: 2019).*

(Continued)

*Primary Examiner* — Mohammad Z Shaikh
(74) *Attorney, Agent, or Firm* — Scully, Scott, Murphy & Presser, P.C.; Jared Chaney

(57) ABSTRACT

A computer-implemented system, platform, method and computer program product for optimizing a data analytics fraud prediction/detection pipeline that includes a combination of a classical machine learned classifier model with a quantum machine learned model to optimize the performance of the fraud prevention model. The feature selection uses different feature maps: one determined by the classic classifier and the other determined by the quantum model implementation that exploits the entanglement quantum property. The quantum method can include a quantum support vector machine implementing a built feature forward algorithm that uses a quantum kernel estimate for feature mapping. This quantum model can be run on a quantum computer or quantum simulator that can run a quantum algorithm built for extracting feature importance. A decision classifier is further developed to decide which model output prediction is more correct in the instance there is a disagreement in each of the ensemble model's activity determination.

20 Claims, 12 Drawing Sheets

(51) Int. Cl.
  *G06N 10/60* (2022.01)
  *G06N 20/10* (2019.01)

(56) References Cited

U.S. PATENT DOCUMENTS

| | | | |
|---|---|---|---|
| 10,540,704 | B2 | 1/2020 | Mazed et al. |
| 10,891,631 | B2* | 1/2021 | Ebel .................. G06N 20/00 |
| 10,977,546 | B2 | 4/2021 | Gambetta et al. |
| 10,990,677 | B2* | 4/2021 | Wiebe .................. G06N 20/00 |
| 11,748,665 | B2* | 9/2023 | Gambetta ............ G06N 10/00 706/12 |
| 2018/0232258 | A1* | 8/2018 | Kendall .................. G06F 9/50 |
| 2018/0247200 | A1 | 8/2018 | Rolfe |
| 2019/0244009 | A1* | 8/2019 | Moussaffi ............ G06V 40/161 |
| 2019/0378025 | A1 | 12/2019 | Corcoles-Gonzalez et al. |
| 2019/0385170 | A1* | 12/2019 | Arrabothu ................ G06N 3/08 |
| 2020/0118025 | A1 | 4/2020 | Romero et al. |
| 2020/0160175 | A1* | 5/2020 | Vahdat .................. G06N 3/045 |
| 2020/0210876 | A1 | 7/2020 | Rolfe et al. |
| 2020/0285947 | A1* | 9/2020 | Gunnels ................ G06N 20/10 |
| 2020/0311107 | A1* | 10/2020 | Crawford ............ G06N 10/00 |
| 2020/0401916 | A1 | 12/2020 | Rolfe et al. |
| 2021/0019647 | A1 | 1/2021 | Macready et al. |
| 2021/0241279 | A1 | 8/2021 | Patten, Jr. et al. |
| 2021/0342730 | A1* | 11/2021 | Redmond ............ G06N 10/40 |
| 2022/0108318 | A1* | 4/2022 | Ramasamy ........ G06Q 20/4016 |
| 2022/0383322 | A1* | 12/2022 | Butvinik ............ G06Q 20/4016 |
| 2022/0398671 | A1* | 12/2022 | Somasundaram ..... G06N 10/00 |
| 2022/0405649 | A1 | 12/2022 | Rastunkov et al. |
| 2023/0110591 | A1* | 4/2023 | Routt ...................... G06F 15/16 706/12 |
| 2023/0112482 | A1* | 4/2023 | Stockert ................ G06N 20/00 707/822 |

OTHER PUBLICATIONS

S. Mitra and K. Rao JV, "Experiments on Fraud Detection use case with QML and TDA Mapper," 2021 IEEE International Conference on Quantum Computing and Engineering (QCE), Broomfield, CO, USA, 2021, pp. 471-472. (Year: 2021).*

A. E. Bouchti, Y. Tribis, T. Nahhal and C. Okar, "Forecasting Financial Risk using Quantum Neural Networks," 2018 Thirteenth International Conference on Digital Information Management (ICDIM), Berlin, Germany, 2018, pp. 386-390. (Year: 2018).*

Pistoia, Marco et al, "Quantum Machine Learning for Finance,", Future Lab for Applied Research and Engineering ,J.P. Morgan ChaseBank, N.A.Sep. 9, 2021,pp. 1-11. (Year: 2021).*

Orus, Roman et al, "Quantum computing for finance: Overview and prospects", Reviews in Physics, Feb. 12, 2019, pp. 1-12.(Year:2019) (Year: 2019).*

Schuld, M., et al., "Quantum machine learning in feature Hilbert spaces", arXiv:1803.07128v1, Mar. 19, 2018, 12 pages.

Abohashima, Z., et al., "Classification with Quantum Machine Learning: A Survey", arXiv:2006.12270, Jun. 22, 2020, 16 pages.

Liu, N., et al., "Quantum machine learning for quantum anomaly detection", arXiv:1710.07405v1, Oct. 20, 2017, 11 pages.

Rebentrost, P., et al., "Quantum Support Vector Machine for Big Data Classification", Physical Review Letters, week ending Sep. 26, 2014, Received Feb. 12, 2014, Published Sepember 25, 2014, pp. 130503-1-130503-5, 113.

Di Pierro, A., et al., "Quantum Machine Learning and Fraud Detection", Lecture Notes in Computer Science, 2021, pp. 139-144, 13066.

Ciliberto, C., et al., "Quantum machine learning: a classical perspective", arXiv:1707.08561v1, Jul. 26, 2017, 32 pages.

Grossi, M., et al., "Mixed Quantum-Classical Method for Fraud Detection with Quantum Feature Selection", arXiv:2208.07963v1, Aug. 16, 2022, 11 pages.

Stein, S., "A Hybrid System for Learning Classical Data in Quantum States", IEEE International Performance Computing and Communications Conference (IPCCC 2021), Oct. 29-31, 2021, 7 pages.

Grossi, M., et al., "Mixed Quantum-Classical Method for Fraud Detection With Quantum Feature Selection", IEEE Transactions on Quantum Engineering, 2022, Received Aug. 15, 2022, Revised Oct. 5, 2022, Accepted Oct. 7, 2022, Published Oct. 10, 2022, date of current version Nov. 16, 2022, pp. 1-12, vol. 3.

International Search Report and Written Opinion received in PCT/EP2022/079135 dated Feb. 7, 2023, 26 pages.

Kahane, et al., "How to Improve Fraud Prevention & Detection Leveraging Machine Learning & Quantum-Inspired Optimization Techniques", 2020, pp. 1-6, White paper Fujitsu Quantum-inspired Digital Annealer, www.fujitsu.com/us.

Fernandez-Lorenzo, S., et al., "Hybrid quantum-classical optimization for financial index tracking", arXiv:2008.12050v1, Aug. 27, 2020, 24 pages.

Hierr, D., et al., "Anomaly detection with variational quantum generative adversarial networks", arXiv:2010.10492v2, Jul. 21, 2021, 12 pages.

Kumar, B.V., et al., "A Novel Feature Selection with Fuzzy Deep Neural Network for Attack Detection in Big Data Environment", Indian Journal of Computer Science and Engineering (IJCSE), May-Jun. 2021, pp. 539-550, vol. 12 No. 3.

Larabi-Marie-Sainte, S., et al., "Outlier Detection Based Feature Selection Exploiting Bio-Inspired Optimization Algorithms", Journal of Applied Sciences, Received Jun. 25, 2021, Accepted Jul. 20, 2021, Published Jul. 23, 2021, 28 pages, 11, 6769.

* cited by examiner

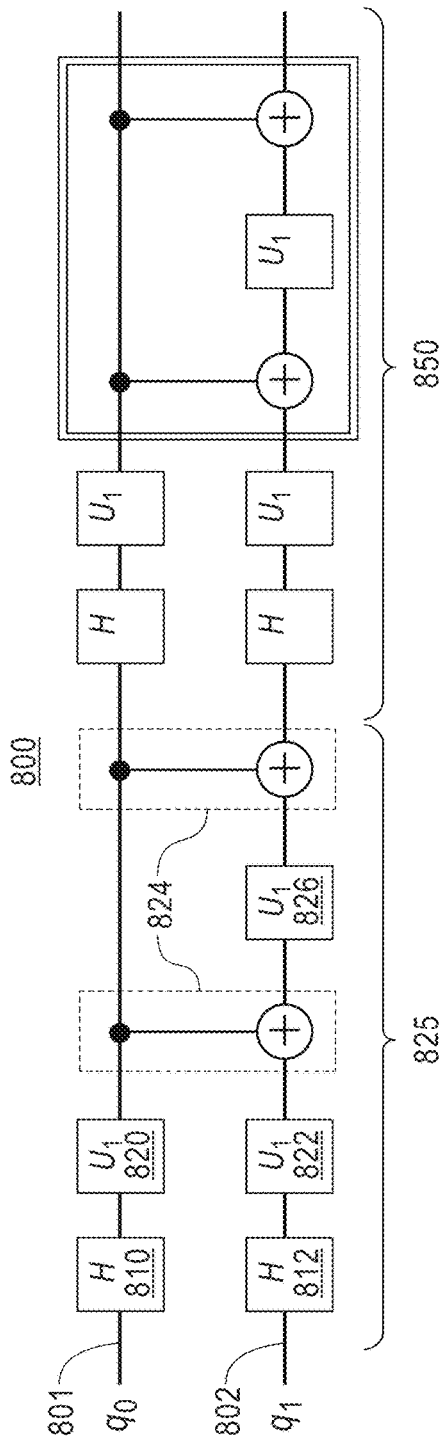

FIG. 9

| Model (feature map) 906 | best Feature 1+2 | | +best Feature 3 | | +best Feature 4 | | +best Feature 5 | | +best Feature 6 | | +best Feature 7 | |
|---|---|---|---|---|---|---|---|---|---|---|---|---|
| | features 902 | accuracy | features | accuracy | features | accuracy | features | accuracy | features | accuracy | features | accuracy |
| QSVM(Z) depth 1 | Feature 2 & Feature 5 | 0.755659 | Feature 8 | 0.749855 | Feature 13 | 0.761521 | Feature 16 | 0.761346 | Feature 12 | 0.766628 | Feature 20 | 0.7757399 |
| QSVM(Z) depth 2 | Feature 2 & Feature 6 | 0.751016 | Feature 5 | 0.748578 | Feature 14 | 0.755136 | Feature 18 | 0.751712 | Feature 17 | 0.771445 | Feature 12 | 0.7826465 |
| QSVM(ZZ) depth 1 | Feature 3 & Feature 4 | 0.760882 | Feature 5 | 0.759779 | Feature 10 | 0.768195 | Feature 12 | 0.772374 | Feature 14 | 0.7799 | | |
| QSVM(ZZ) depth 2 | Feature 2 & Feature 5 | 0.767266 | Feature 9 | 0.772664 | Feature 11 | 0.776553 | Feature 15 | 0.778758 | Feature 19 | 0.779919 | Feature 21 | 0.768566 |

FIG. 10

950 best features for ZZ depth 2 for best 7

0.789

Feature 2

Feature 5

Feature 9

Feature 11

Feature 15

Feature 19

Feature 21

952 best features for ZZ depth 1 for best 6

Feature 3

Feature 4

Feature 5

Feature 10

Feature 12

Feature 14

956 best features for Z1 depth 2 for best 7

0.782

Feature 2

Feature 6

Feature 5

Feature 14

Feature 18

Feature 17

Feature 12

958 best features for Z1 depth 1 for best 7

0.775

Feature 2

Feature 5

Feature 8

Feature 13

Feature 16

Feature 12

Feature 20

FIG. 11

MIXED QUANTUM-CLASSICAL METHOD FOR FRAUD DETECTION WITH QUANTUM FEATURE SELECTION

FIELD

The present application relates generally to information handling, data processing, and/or data analytics, and more particularly to systems, platforms, computer program products, and/or methods for detecting suspicious activities. These include high risk and potentially fraudulent financial transaction attempts, as well as money laundering.

BACKGROUND

There is a regulatory need for monitoring financial transactions and activity of account holders at financial institutions to detect any suspicious, fraudulent, and/or criminal activity. Governmental anti-money laundering (AML) and other regulations may require a financial institution to monitor for activities and behavior indicative of criminal or fraudulent activity. Detecting activity indicative of fraudulent or criminal activity is increasingly difficult due to the large amount of data and information, such as, for example, numerous financial transactions, and numerous parties/entities and due to the many payment options available, debit card, credit cards, on-line electronic payment schemes via merchant accounts. In addition, payment fraud committed by third parties, such as credit card fraud and online banking account takeover hurts the health of entire financial systems if no prevention systems keep them under control.

There have been developed electronic systems and data analytical processes to detect activity indicative of fraud, criminal behavior, and other suspicious activity. These advanced information and data processing systems discover, define, and detect data patterns within relationship networks, for example, a large-scale network of financial transactions involving numerous parties and transactions, that are indicative of suspicious activity and behavior.

Businesses need to prevent fraudulent transactions from occurring on a transaction-by-transaction basis, and because of the billions of annual transactions that each must be processed within milliseconds require automated solutions to keep up with the volume of transactions. To this end, currently classical machine learning methods are used. These methods predict whether a transaction is likely to be fraudulent based on historical data pattern, and their comparison to the current transaction. Transactions that are likely to be fraudulent are blocked in-flight in order to prevent fraud from occurring. This saves financial institutions money because the cost of resolving a fraud is greater than the amount of the fraud itself.

However, in automated fraud detection there is a tradeoff between detecting fraud and mislabeling genuine transactions as fraud. For example, if the machine learned (ML) model labels all transactions as fraud there will be no "false negative" transaction where a fraud was not detected, but there will be only "false positive" transaction where genuine transactions are turned away. When a genuine transaction is turned away, the organization loses money and may permanently lose the respective customer to other payment methods and loose brand value. Conversely, if the platform does not label any transaction as a fraud, then there will be no false positives, but many fraudulent transactions will need to be settled and this will cost the organization money.

In reality, machine learning algorithms strike a balance between false positives and false negatives by determining a sensitivity threshold above which a fraud will be identified. Typically, the ML model creates a score for each transaction and the "sensitivity" threshold being set by the financial institution to reflect their "appetite for risk". They will set the threshold high if they want to lower false positives, and they will set it low if they want to increase fraud loss reductions. The ML model maps a set of inputs to a score and that score is compared to a threshold. It is the quality of the score predicting fraud that is key, and that is entirely independent of the type of algorithm. Different algorithms have different trade-offs between false positives and false negatives. For example, as illustrated in FIGS. 1A and 1B, there is plots of receiver operator curves for different algorithms. Choosing different thresholds for the same algorithm changes the balance between false positives and false negatives. In practice, the number of fraudulent transactions is much smaller than the number of genuine transactions, and, as such, the problem is to create a better trade off between false positives and false negatives on an imbalanced dataset. At the same time algorithms with better trade offs between false positives and false negatives have better accuracy scores when the data is balanced, that is, when the number of genuine transactions is equal to the number of fraudulent transactions. With any model generated score, the balance between "hit rate" and "false positives" can be set by the threshold that the score is compared to decide if a transaction is intercepted or not. It is rather the "score quality" that is of relevance. A high quality score allows a threshold to be set for high hit rate and low false positives; at the same time, a low quality score will deliver poor hit rate and high false positives at any threshold. In this case, the problem can be cast as achieving a better accuracy score for predicting frauds on a dataset that has had the genuine transactions down-sampled such that the number of genuine transactions is equal to the number of fraudulent transactions.

In the graph 2 depicted in FIG. 1A, shows the performance of two models, wherein the y-axis is the false positive (F/P) rate, e.g., the number of false positives divided by the number of true positives, and the x-axis is the hit rate or 1—false negative rate, where the false negative rate is the number of false negatives divided by the number of actual fraudulent transactions. The plot of the model 5 indicates the better performing model because there are fewer false positives for a given hit rate. In the graph 7 depicted in FIG. 1B, the x-axis shows the false alarm ratio, which has been calculated as the number of false positives divided by the number of genuine transactions (true negatives plus false positives) and the y-axis is the hit rate. In the graph 7, the model represented by curve 9 is a better performing model because it has a higher hit rate for a given level of false positives.

SUMMARY

The summary of the disclosure is given to aid understanding of, and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, platform, processing pipeline, their architectural structure, the computer program product, and/or their method of operation to achieve different effects. In this regard it will be appreciated that the disclosure presents and describes one or more inventions, and in aspects includes numerous inventions as defined by the claims.

A system, method and computer program product has been developed to improve accuracy of a fraud prevention model.

In particular, the system, method and computer program product combine the classical machine learning with quantum machine learning to optimize the performance of the fraud prevention model.

For the quantum machine learning model, there is built a feed forward feature selection algorithm using different feature maps (quantum kernel estimate) that can use quantum property of entanglement for extracting feature importance.

One or more embodiments of a system, platform, computer program product, and/or method is disclosed for optimizing a fraudulent activity detection pipeline.

According to an aspect, there is provided a computer-implemented method of detecting fraudulent transactions. The method comprises: receiving, at a first computing system running a first prediction model, a first set of attributes associated with a current payment transaction, the first prediction model trained to detect a fraudulent transaction; generating, at the computing system, a first output score from the first prediction model; receiving, at a second computing system running a second prediction model, a second set of attributes associated with the current payment transaction, the second prediction model trained to detect a fraudulent transaction, the second computing system being a quantum computing system or a quantum computer simulator; generating, by the second computing system, a second output score from the second prediction model; comparing, at the first computing system or second computing system, the generated first output score and the generated second output score; determining, based on the comparison, whether the generated first output score and second output score indicate an agreement as to a fraudulent current payment transaction or not; responsive to determining a disagreement between the generated first output score and second output score, inputting the first set of attributes or a subset thereof and the first generated output score, the second set of attributes or a subset thereof and the second generated output score to a third prediction model run at the first computing system, the third prediction model trained to determine a correctness of either the first generated output prediction based on the first output score or the second generated output prediction based on the second output score; and outputting, by the third prediction model, a decision based on the determined correctness.

According to one or more aspects, there is provided a system platform for detecting fraudulent transactions. The system comprises: a first prediction model trained to detect a fraudulent transaction, the first prediction model configured to receive a first set of attributes associated with a current payment transaction; a first computing system running the first prediction model with the first set of attributes to generate a first output score; a second prediction model trained to detect a fraudulent transaction, the second prediction model configured to receive a second set of attributes associated with a current payment transaction; a second computing system running the second prediction model with the second set of attributes to generate a second output score, the second computing system being a quantum computing system or a quantum computer simulator; a hardware processor, associated with either the first computing system or second computing system, the hardware processor configured to: receive the generated first output score and the generated second output score; determine, based on the comparison, whether the generated first output score and second output score indicate an agreement as to a fraudulent current payment transaction or not; and responsive to determining a disagreement between the generated first output score and second output score, input the first set of attributes and the first generated output score, the second set of attributes and the second generated output score to the first computing system running a third prediction model, the third prediction model trained to determine a correctness of either the first generated output prediction based on the first output score or the second generated output prediction based on the second output score; and the first computer system configured to output, by the third prediction model, a decision based on the determined correctness and a final prediction.

In an embodiment, a computer programming product is provided that includes instructions that, when executed by at least one hardware processor, configure the at least one hardware processor to perform one or more of the steps, tasks, and/or functions described herein, and the system and/or platform includes a non-transitory memory storage device storing program instructions; and a hardware processor having circuitry and logic to execute said program instructions, wherein the hardware processor is in communication with said memory storage device and in response to executing said program instructions, is configured to perform the steps, task, and/or functions described herein.

The foregoing and other objects, features, and/or advantages of the invention will be apparent from the following more particular descriptions and exemplary embodiments of the invention as illustrated in the accompanying drawings wherein like reference numbers generally represent like parts of the illustrative embodiments of the invention.

BRIEF DESCRIPTION OF THE DRAWINGS

The various aspects, features, and embodiments of a system, platform, computer program product, and/or method to optimize a fraud detection system for determining suspicious or fraudulent payment activity associated with a conducted transaction will be better understood when read in conjunction with the figures provided. Embodiments are provided in the figures for the purpose of illustrating aspects, features, and/or various embodiments of the systems, platforms, computer program products, and/or methods, but the claims should not be limited to the precise arrangement, structures, features, aspects, systems, platforms, modules, functional units, assemblies, subassemblies, circuitry, embodiments, instructions, programming, methods, processes, techniques, and/or devices shown, and the arrangements, structures, features, aspects, systems, platforms, modules, functional units, assemblies, subassemblies, circuitry, embodiments, instructions, programming, methods, processes, techniques, and/or devices shown may be used singularly or in combination with other arrangements, structures, features, aspects, assemblies, subassemblies, systems, platforms, modules, functional units, circuitry, embodiments, instructions, programming, methods, techniques, processes, and/or devices.

FIG. 9 depicts a quantum circuit or quantum kernel estimate used for feature selection in an example embodiment;

FIG. 10 depicts a table showing example results showing accuracy results for different features selected depending on the degree of entanglement and structure of the chosen quantum feature map;

FIG. 11 shows different output example feed forward selected features depending on the degree of entanglement and structure of the chosen quantum feature map;

DETAILED DESCRIPTION

Figure 1A:
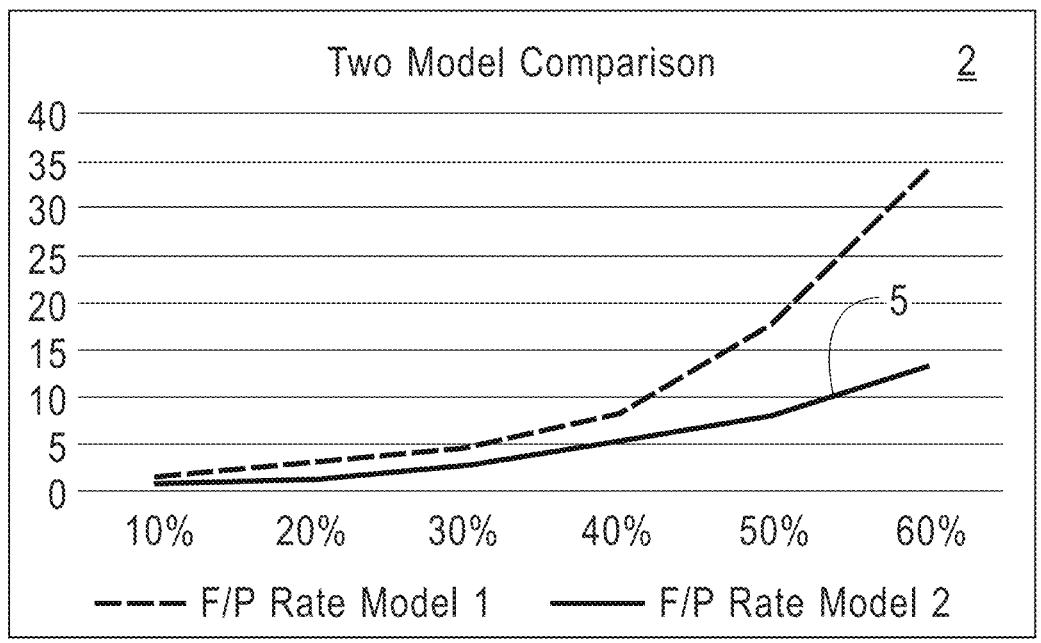
FIGS. 1A and 1B show respective plots depicting the performance of two models to illustrate the need to improve fraud prevention model performance to prevent monetary losses from false positives and false negatives in transaction monitoring for fraud detection.
Figure 1B:
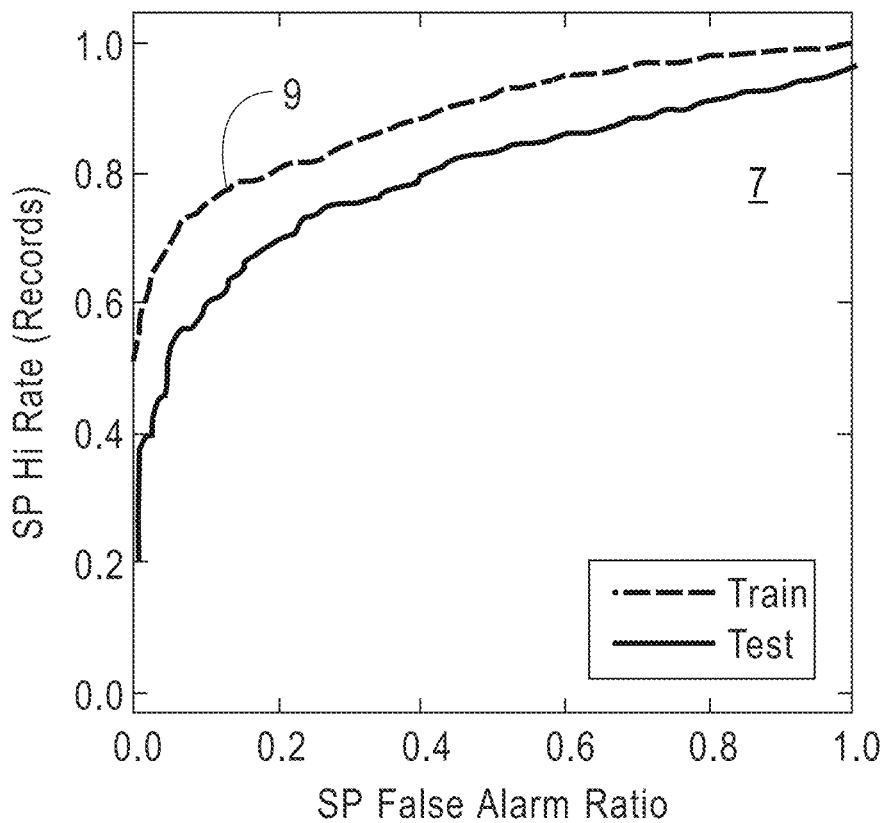

In one aspect, the following description is a system, method and computer program product that addresses an entity's potential loss of business and consumer customers when a genuine commercial transaction between one or more entities is labeled as fraudulent ("false positive") and when a fraudulent transaction is labeled as genuine ("false negative").

The present disclosure provides a system and method to detect fraudulent activity which can be used to prevent monetary losses from occurrence of false positives and false negatives in transaction monitoring for fraud detection (and potentially for other transaction monitoring use cases).

The following description is made for illustrating the general principles of the invention and is not meant to limit the inventive concepts claimed herein. In the following detailed description, numerous details are set forth in order to provide an understanding of the system, platform, computer program product, method, and/or techniques for optimizing a pipeline for detecting suspicious activity, however, it will be understood by those skilled in the art that different and numerous embodiments of the system, platform, computer program product and/or their method of operation may be practiced without those specific details, and the claims and disclosure should not be limited to the arrangements, structures, systems, assemblies, subassemblies, platforms, modules, functional units, circuitry, embodiments, features, aspects, instructions, programming, processes, methods, techniques, and/or details specifically described and shown herein. Further, particular features, aspects, arrangements, structures, systems, assemblies, subassemblies, platforms, modules, functional units, circuitry, embodiments, instructions, programming, processes, methods, techniques, details, etc. described herein can be used in combination with other described features, aspects, arrangements, structures, systems, assemblies, subassemblies, platforms, modules, functional units, circuitry, embodiments, instructions, programming, processes, methods, techniques, details, etc. in each of the various possible combinations and permutations.

The following discussion omits or only briefly describes conventional features of information processing systems and data networks, including electronic data analytics programs or electronic risk assessment tools, platforms, computer program products and/or methods configured and adapted to detect suspicious activity and generate alerts in connection therewith, for example, financial transactions such as on-line payments, which should be apparent to those skilled in the art. It is assumed that those skilled in the art are familiar with data processing and data analytics including large scale data processing/analytics (also referred to as information/data processing systems) and their operation, and the application of data analytics, including data analytics systems and processes to detect suspicious activity that may be indicative of fraud and/or other criminal behavior. It may be noted that a numbered element is numbered according to the figure in which the element is introduced, and is typically referred to by that number throughout succeeding figures.

Figure 2:
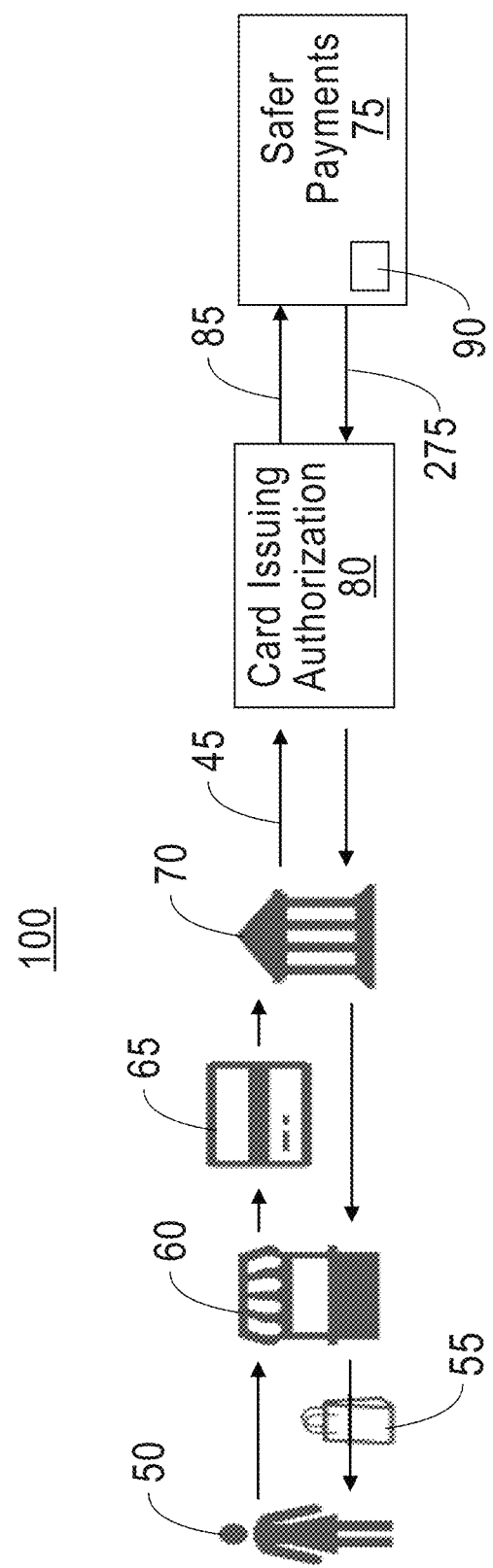
FIG. 2 conceptually depicts an example computer system platform within which is implemented hybrid classical-quantum ensemble model techniques for determining the validity of transactions and detect suspicious fraud patterns with higher accuracy according to aspects of the present disclosure.

FIG. 2 conceptually depicts an example computer system platform 100 within which is implemented techniques employing an ensemble of models to determine the validity of transactions and detect suspicious activity with higher accuracy. One such computer system platform is IBM® Safer Payments computing system platform which is configured as a fraud detection system 75 implementing an ensemble of machine learned models for classifying and detecting instances of fraud while limiting instances of false positives. The embodiments of the mixed classical-quantum ensemble method of the present disclosure can be implemented in any fraud prevention system 75 used to detect fraud. Such fraud detection system can have components including, but not limited to: an inbuilt database, inbuilt feature extraction by behavioral profiling techniques, and inbuilt modelling techniques: e.g., decision trees (Rule Based model), Random Forest, etc. and capability to ingest externally trained models.

According to an aspect of the present disclosure, the fraud detection system 75 implements a mixed classical-quantum ensemble method involving both a classical-based machine learning model and a quantum-computing based machine learned model for classifying and detecting instances of fraud while limiting instances of false positives. In an embodiment, the computer system platform 100 enables users 50 to conduct any transaction via a point of sale (POS) terminal 60 associated with a vendor, in real-time, e.g., to purchase an item 55 using a credit card or debit card 65 or some form of instantaneous digital payment at a point of sale (POS) terminal, and enables a central authority, e.g., a bank 70 and/or a card issuing authority 80 to authorize or validate the transaction over a data communications channel(s). In a particular non-limiting embodiment, the fraud prevention system 75 is a service provided on the computer system platform 100 enabling the bank 70 or card issuing authority 80 to, prior to authorizing the payment, implement the fraud detection ensemble models in real-time (i.e., an on-line mode of operation) to analyze the current transaction data 85 and generate a fraud score 90 that is used to indicate the validity of the current payment transaction. Based on this score 90, the system 75 will either pre-validate the transaction or generate an alert indicating a fraudulent payment attempt. In an embodiment, use of the credit or debit card or any payment method 65 invokes issuance, e.g., by the bank, of a payment authorization 45 resulting in the issuing authority 80 receiving the transaction data 85 and sending it to the fraud prevention system 75 such as IBM's Safer Payments or like payment authorization system.

This fraud prevention system 75 operates to generate an estimator of fraud probability or a fraud probability score 90 indicating that the current payment transaction is fraudulent or valid. Based on the fraud probability score 90, the bank 70 and/or a card issuing authority 80 will, in real-time, either approve the transaction as valid, or not approve the transaction as being potentially fraudulent and generate a communication such as an alert signal 275 back to the requesting central authority.

Figures 3, 4:
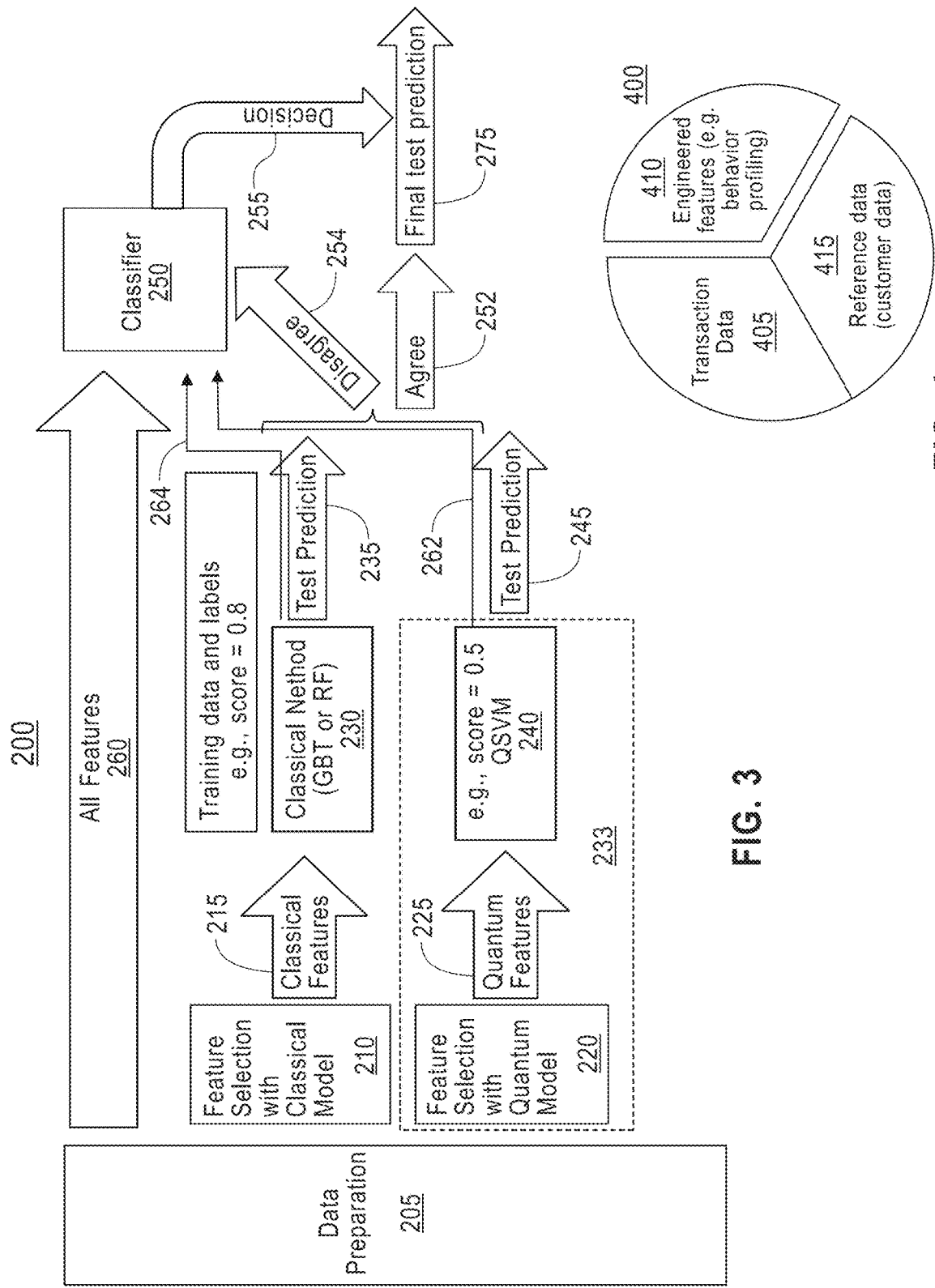
FIG. 3 shows an embodiment of a fraud detection/prevention computing system employing a hybrid classical-quantum ensemble method in an aspect of the present disclosure.
FIG. 4, there is depicted a pie chart showing the types of historical data that can be collected, stored and used for training the classical-quantum ensemble models used in the system of FIG. 3.

FIG. 3 shows an embodiment of a fraud detection/prevention computing system 200 employing a hybrid classical-quantum ensemble method in an aspect of the present disclosure.

As shown in FIG. 3, stored historical transaction data is ingested and readied for use in training feature selection models: a classifier model 210 and a quantum model 220, using data preparation techniques 205. Types of data preparation techniques can include, but are not limited to: a) Remove highly correlated features from set of extracted features. Historical data set has fraud marks; b) Balance the data by under sampling account records without fraud; c) apply treatment for categorical data types; d) normalize data values to [−1,1] range; and e) divide the data into "training" and "test" sets for use when training the models.

Referring to FIG. 4, there is depicted a pie chart 400 showing the types of historical data that can be collected, stored and used for training the classical-quantum ensemble models used in the system of FIG. 3. Such types of data can include but is not limited to pure transaction data 405, e.g., associated transaction attributes including but not limited to: a transaction amount, a card issuer identifier, a card number, a credit line, a merchant category code or country code, a merchant identifier, a POS entry mode, a response code, a terminal identifier, a transaction timestamp, etc..

Further transaction data for use as model training features can include human engineered data 410, such as behavioral profiling data developed by humans that track, using counters, information such as, but not limited to: card use frequency within a predetermined time period, e.g., 24 hours, a frequency of the highest amounts transaction or a sum of the amounts transacted over a predetermined time period, e.g., 24 hours, a number of transaction declinations, a number of transactions occurring using the same merchant, a number of transactions of a most occurring merchant category code over a fixed time period, e.g., 10 days, etc..

Further behavioral profiling data developed by humans for use as model training features include calendar type attribute information such as, but not limited to activity counts, e.g., transaction frequencies, total transaction amounts, etc. over last predetermined time period, e.g., 3 days, 4 days, yesterday.

Further transaction data for use in model training can include customer data 415 including information such as customer age, and/or customer country data.

In the manner as described, each feature selection model 210, 220 is being trained to select the features from the particular data transactions for use in subsequent training a respective classical Classifier fraud prediction model 230 and a Quantum classification fraud prediction model 240. In an embodiment, the respective features 215 selected for use in training classical Classifier model 230 and features 225 selected for use in training the Quantum model 240 can be the same or different.

In an embodiment, in off-line processes, classifier model 210 receives historical transaction data and corresponding labels and is trained to select features 215, for example, using a technique such as recursive feature elimination, for use in training a Classification model 230. The model receives the transaction data as well as the historical label, i.e., a "ground truth", for each transaction (whether it is fraud or not). The model is trained by trying to predict this ground truth. It optimizes a set of decision rules until the predictions it makes on the training data are close to the "ground truth" (or labels). Trained Classification model 230 is used to generate, in real-time, a fraud score based on a current transaction data received in real-time from a customer for use in determining in real-time whether a current payment associated with a corresponding received customer transaction data is potentially fraudulent. In an embodiment, Classification model 230 can be a supervised learning model associated with learning algorithms that classify data into categories. Such a Classification model 230 can be a gradient boosted tree model, or a random forest model for classification. In an embodiment, for a current received payment transaction, the Classification model 230 will generate a fraud prediction 235 which can include a fraud score or value based on the classical prediction model output.

Likewise, in off-line processes, quantum model 220 receives historical transaction data and corresponding labels and is trained to select features, for example using the forward feature selection technique with the quantum model as the classifier, for use in training a Quantum model 240. When operating on-line, trained Quantum model 240 is used to generate, in real-time, a fraud probability score based on a current transaction data received in real-time from a customer for use in determining in real-time whether a current payment associated with a corresponding received customer transaction data is potentially fraudulent. In an embodiment, Quantum model 240 can be a supervised learning model associated with learning algorithms that classify data into categories. Such a quantum model 240 can be a quantum support vector machine (QSVM) model for classification. In an embodiment, for a current received payment transaction, the Quantum model 240 will generate a fraud prediction 245 which can include a fraud score or value based on the Quantum prediction model output. As shown in FIG. 3, quantum simulators and/or near term quantum hardware 233 can be used in the quantum model part of the algorithm. Fewer features can be used in the quantum algorithm, but the QSVM with fewer features still complements the classical algorithm using more features. Increases in accuracy of fraud prediction can still be found in the near term. The quantum forward feature selection technique is important for obtaining near term advantage.

As further shown in FIG. 3, for the current selected features data received for a current payment transaction, each respective score 235, 245 produced by the respective classical classifier model 230 and quantum classifier model 240 can indicate either a potential fraudulent payment or a valid payment transaction. For example, a score 235, 245 both being greater than a predetermined threshold value, which may be different for each classifier or the same, e.g., 0.5, can indicate a potential fraudulent payment, or conversely indicate a potential valid payment for that current transaction. Thus, if both of the fraud prediction values 235, 245 are determined as being above (or below) the predetermined threshold value, and both values are the same or differ by a small amount or tolerance value from each other, then the classical Classifier model 230 and Quantum model 240 algorithms are deemed as in agreement 252 and a corresponding fraud prediction result 275 is generated that is indicative of either a potential fraudulent payment or a valid payment transaction. This corresponding final fraud prediction score result 275 is generated and is communicated back to the requesting entity (e.g., bank or card issuing authority) and the current transaction can either be approved or prevented.

However, in an embodiment, if it is determined that each of these fraud prediction scores or values 235, 245 are not the same and one model's output score is above the predetermined threshold value, and the other model's output score is below the predetermined threshold value, e.g., 0.5, then the classical Classifier model 230 and Quantum model 240 algorithm outputs are deemed to be not in agreement 254 as one is detecting a potential fraud scenario and the other is detecting a valid scenario. In such a scenario, upon determination of such model output disagreement, a disagreement signal 254 is communicated to the same or different computing system trigger invocation of a further classifier model 250 to determine which output model result to believe. The further model 250 can be a logistic regression model or other classifier model.

In an embodiment, the further classifier model 250 is a supervisory model, e.g., a logistic regression model, that is trained to "decide" which algorithm to believe, i.e., determine which model output indicating a genuine or fraudulent transaction is more correct. This classifier model 250 training is based on_estimated training probabilities including any disagreement plus fraud/genuine labels. However, classifier model 250 is trained using transaction features including those features and training data labels 262 that have been selected for use in training the individual Quantum model 240 algorithm and output transaction fraud probability scores and those features and training data labels 264 that have been selected for use in training the individual classical Classifier 230 and output transaction fraud probability scores and optionally, other non-selected features. For example, in the case of receiving a disagreement signal 254, the trained further classifier model 250 is configured to receive the complete set of features for the current transaction including those selected for use by the respective classical Classifier model 230 and Quantum model 240 algorithms. Based on this full set of current transaction data 260, the trained further classifier model 250 generates an output decision score 255 that is used as the final score result 275 that is a final indication of either a potential fraudulent payment or a valid payment transaction. It should be noted that each of the quantum classifier 240 and classical classifier 230 may represent one or more quantum or classical classifiers respectively or ensembles thereof.

Whether determined by agreement of both classifiers 230, 240 or whether determined by further classifier 250, the corresponding final fraud prediction score result 275 for the current transaction is generated and, as shown in FIG. 2, is communicated back to the requesting entity (e.g., bank or card issuing authority) such that the current transaction can either be approved or prevented, e.g., at the POS terminal 30 associated with the vendor.

Figure 5:
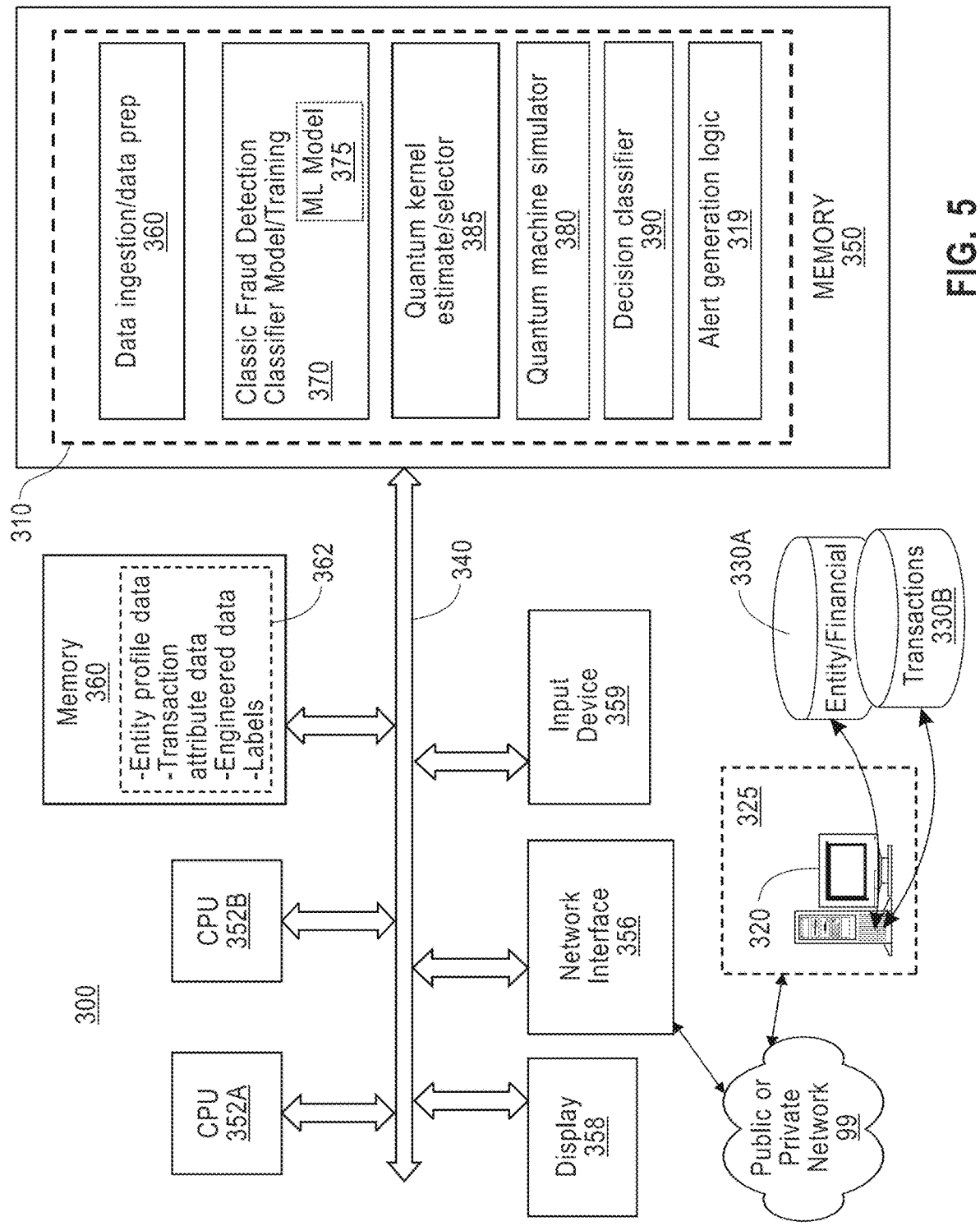
FIG. 5 illustrates an example computer system functioning as an electronic risk assessment tool implementing program modules to detect fraudulent activity in the domain of financial services and financial fraud detection.

FIG. 5 illustrates an example computer system functioning as an electronic risk assessment tool 300 implementing methods to detect fraudulent activity in the domain of financial services and financial fraud detection. In one or more embodiments, such a system tool 300 may be employed by or for a financial institution or card-issuing/processing authority who may issue, or a regulatory authority who may receive transaction(s) related data for real-time transaction validation/authorization.

In the context of detecting fraud, e.g., suspicious financial activity, risk assessment tool 300, according to one embodiment, is a computer system, a computing device, a mobile device, or a server configured to run risk assessment software applications and models. In some aspects, computing device 300 may include, for example, personal computers, laptops, tablets, smart devices, smart phones, or any other similar computing device, an embodiment of which is described in more detail in FIG. 13.

Computing system 300 includes one or more hardware processors 352A, 352B (also referred to as central processing units (CPUs)), a memory 350 (e.g., for storing an operating system, application program interfaces (APIs) and program instructions), a network interface 356, a display device 358, an input device 359, and any other features common to a computing device. In one or more aspects, computing system 300 may, for example, be any computing device that is configured to communicate with one or more networks and/or websites 325 including a cloud-based or web-based server 320 over a public or private communications network 99. For instance, network 325 may include a bank or like financial institution or card issuing authority or like central authorizing that records/stores information, e.g., payment transactions occurring between two or more parties. Such electronic transactions may be stored in a database 330B with associated feature transaction information, related customer information and related human engineered data in related database 330A. Further, as shown as part of system 300, there can be a local memory and/or an attached memory storage device 360, or a remote memory storage device, e.g., a database, accessible via a remote network connection for input to the system 300.

In the embodiment depicted in FIG. 5, processors 352A, 352B may include, for example, a microcontroller, Field Programmable Gate Array (FPGA), or any other processor that is configured to perform various operations. Communication channels 340, e.g., wired connections such as data bus lines, address bus lines, Input/Output (I/O) data lines, video bus, expansion busses, etc., are shown for routing signals between the various components of system 300. Processors 352A, 352B are configured to execute instructions as described below. These instructions may be stored, for example, as programmed modules in an associated memory storage device 350.

Memory 350 may include, for example, non-transitory computer readable media in the form of volatile memory, such as random-access memory (RAM) and/or cache memory or others. Memory 350 may include, for example, other removable/non-removable, volatile/non-volatile storage media. By way of non-limiting examples only, memory 350 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Network interface 356 is configured to transmit and receive data or information to and from a network and/or web-site server 120, e.g., via wired or wireless connections. For example, network interface 356 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 300 to transmit information to or receive information from the server 320.

Display 358 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 358 may include a liquid crystal display (LCD), an e-paper/e-ink display, an organic LED (OLED) display, or other similar display technologies. In an aspect, display 358 may be touch-sensitive and may also function as an input device. Input device 359 may include, for example, a keyboard, a mouse, a touch-sensitive display, a keypad, a microphone, or other similar input devices or any other input devices that may be used alone or together to provide a user with the capability to interact with the computing device 300.

With respect to configuring the computer system as a risk assessment tool 300 for detecting suspicious activity, e.g., transaction payment fraud and/or other financial fraud, and creating alerts, the local or remote memory 360 may be configured for temporarily storing information and associated metadata used by other modules including but not limited to: transaction entity data, feature/transaction attribute data, labels data, human engineered data, customer profile data and associated metadata obtained from real-time transactions and/or data stored in the electronic databases 330A, 330B. Alternately or in addition, these transactional data and meta-data 362 can be stored in a separate local memory storage device attached to the computer system 300.

Memory 350 of computer system 300 in one or more embodiments stores processing modules that include programmed instructions adapted to perform risk assessment as it relates to detecting fraudulent payment activity, e.g., financial fraud.

In an embodiment, one of the programmed processing modules stored at the associated memory 350 include a data ingestion module 365 that provides instructions and logic for operating circuitry to access/read large amounts of data (e.g., detailed transaction data, related human engineered data and engineered features, customer profile data, etc.) for use by other modules that process and analyze the data to form predictions and output alerts. In one or more embodiments, the input data for data ingestion module 365 aforementioned data preparation techniques, e.g., for use in reducing correlations among the data.

In an embodiment, memory 350 includes a conventional (i.e., classical) fraud detection classifier model module 370 that provides instructions and logic for operating circuitry to process and analyze transaction features data and related engineered data, typically large amounts of data, and to train using supervised machine learning the classical classifier model 230, in an off-line mode, to select and process features for use in determining a fraudulent activity as provided by the trained classifier model. Based on the data and the trained classifier model, authorizations and/or alerts can be produced by platform 300 for a given transaction. To select features and generate a fraud prediction, classical classifier model 230 is used with classical hardware and classical methods to select classical features of importance in process "feature selection with classical model" 210. In an embodiment, one type of classic fraud detection classifier model can be an XGBOOST classic classifier model 375 with features selected using classical feature selection methods such as recursive feature elimination method (by way of example and not limitation).

In an embodiment, another optional processing module stored at the associated computer memory 350 is a quantum machine simulator module 380 that includes instructions and logic for operating circuitry to simulate quantum circuits and algorithms, e.g., using Python call-outs via Qiskit software package. For example, configurations such as the number of circuits and gate types that can be executed, along with configuration details of control electronics can be programmed including the number of qubits to be processed. A simulator "statevector" integrated with QISKIT can be specified to simulates a quantum circuit by computing the wavefunction of the qubit's statevector as gates and instructions are applied. A general purpose simulator "QASM" integrated with QISKIT can be specified for simulating quantum circuits both ideally and subject to noise modeling. The simulation method is automatically selected based on the input circuits and parameters.

Figure 12:
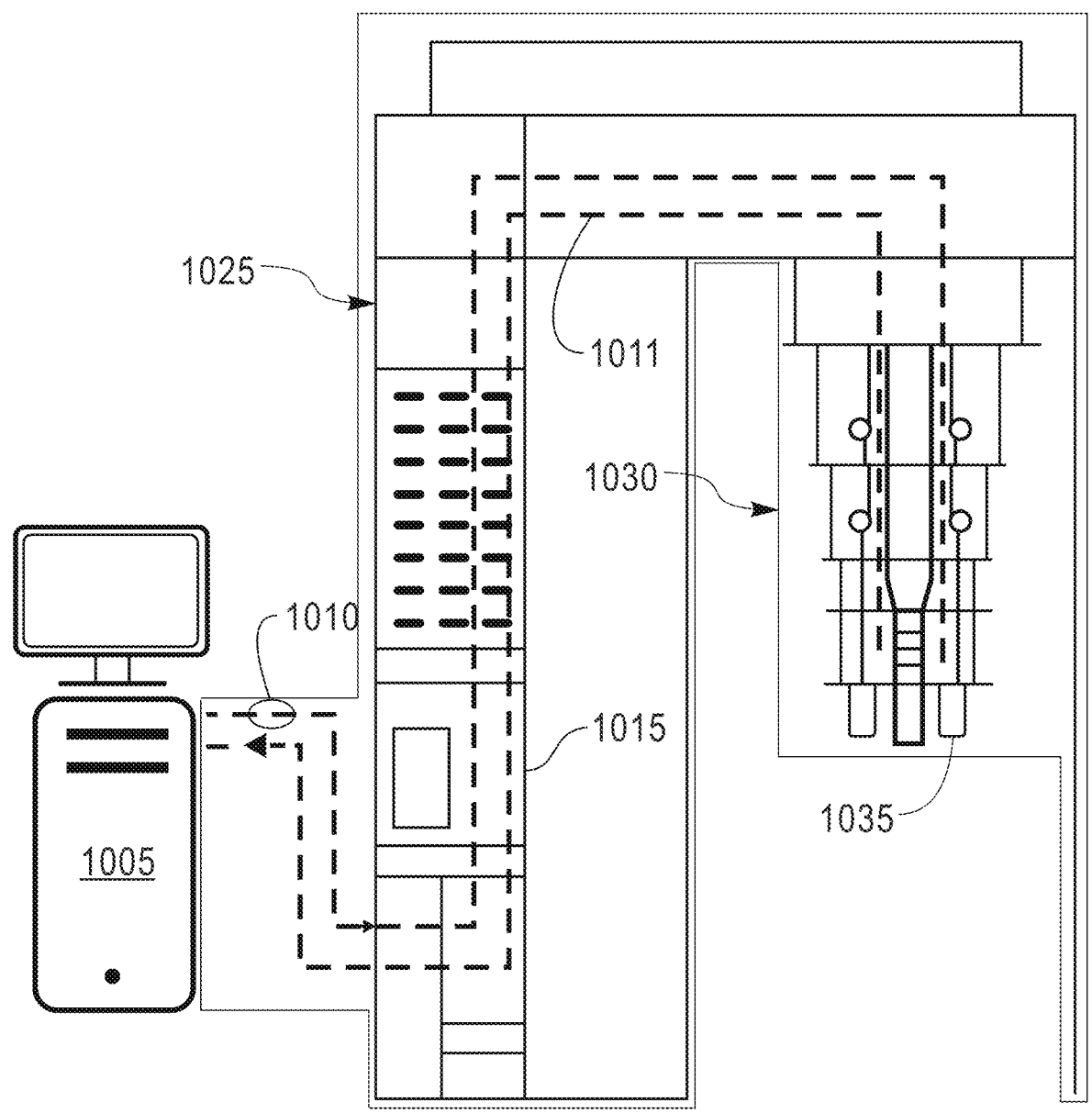
FIG. 12 shows an example quantum computer within which the quantum model and quantum kernel estimate can run in an embodiment.

In an embodiment, computing system and/or risk assessment tool 300 can also include a system, platform, computer program product, and/or computer programming module 385 built from Python routines via the Qiskit package for performing, in an off-line mode, the QSVM feature mapping (i.e., provide the Quantum kernel estimate) for feature selection using the Quantum model 240 (in process 220 "feature selection with quantum model". It also uses the selected features for training the QSVM quantum model. In one or more non-limiting embodiments, the QSVM ZZ algorithm of depth 2 is the quantum model algorithm used to select the features for the QSVM model training and subsequent model use, however other feature maps (e.g., QSVM XY depth 2) can be used. In an embodiment, the Quantum model 240 algorithm can be run on a quantum computer hardware such as shown in FIG. 12 or a quantum computing simulator to explore the feature space using quantum kernel for determining quantum features for selection. Simulators and near term quantum hardware (not shown) can be used in the quantum part of the algorithm. Fewer features can be used in the quantum algorithm, but the QSVM with fewer features still complements the classical algorithm using more features. Increases in accuracy of fraud prediction can still be found in the near term. The quantum forward feature selection technique is important for obtaining near term advantage because it exploits the fact that quantum hardware (or simulators) can detect novel more complex patterns in relationships between features and outcomes. Moreover, the quantum forward feature selection technique results in reducing the data dimensionality needed for the near term systems limited in qubit count, and allows for exploiting the quantum hardware to detect new patterns.

In an embodiment, this forward feature selection method is done with quantum hardware by exploiting the quantum properties such as entanglement.

In an embodiment, memory 350 includes a Decision classifier model module 390 that provides instructions and logic for operating circuitry to process and analyze transaction features data and related engineered data, genuine/ fraudulent transaction labels, fraud probability scores to detect which fraud prediction algorithm is correct when there is a disagreement as to fraud prediction among the classic classifier and quantum models. With respect to FIG. 6, this decision classifier is trained, in an off-line mode, using supervised machine learning based on selected feature sets of both the classical classifier model 230 and the quantum classifier model 240, any non-selected features, labels and generated model output probability scores for use in determining which model's output prediction is more correct. In an embodiment, the decision classifier can be a logistic regression model or like classifier model. It is noted that the same training data on which the classical classifier, 230, and the quantum classifier, 240 are trained on (or a cross validation set) as well as the output probability scores for the training data (or cross validation set) are used to the train the third Decision classifier model 250 in the off-line mode.

In an on-line mode of operation, based on the determined fraud prediction whether determined as a result of the models' predictions being in agreement, or based upon a determination by the decision classifier as to which model output is correct, an alert generation logic module 319 is provided with instructions and logic for operating circuitry to generate a valid message indicating the current transaction has been determined as genuine or valid or an alarm message indicating the current transaction has been determined potentially fraudulent.

Memory 350 optionally includes a further supervisory program having instructions for configuring the computing system 300 to call one or more, and in an embodiment all, of the program modules and invoke the ensemble classic and quantum fraud detection operations in risk assessment platform 300. In an embodiment, the supervisory program calls methods and provides application program interfaces (APIs) for running fraud detection models 230, 240 of FIG. 3 in both on-line and off-line mode of operation, and for producing authorization signal or alert signals when detecting a fraud activity.

Figure 6:
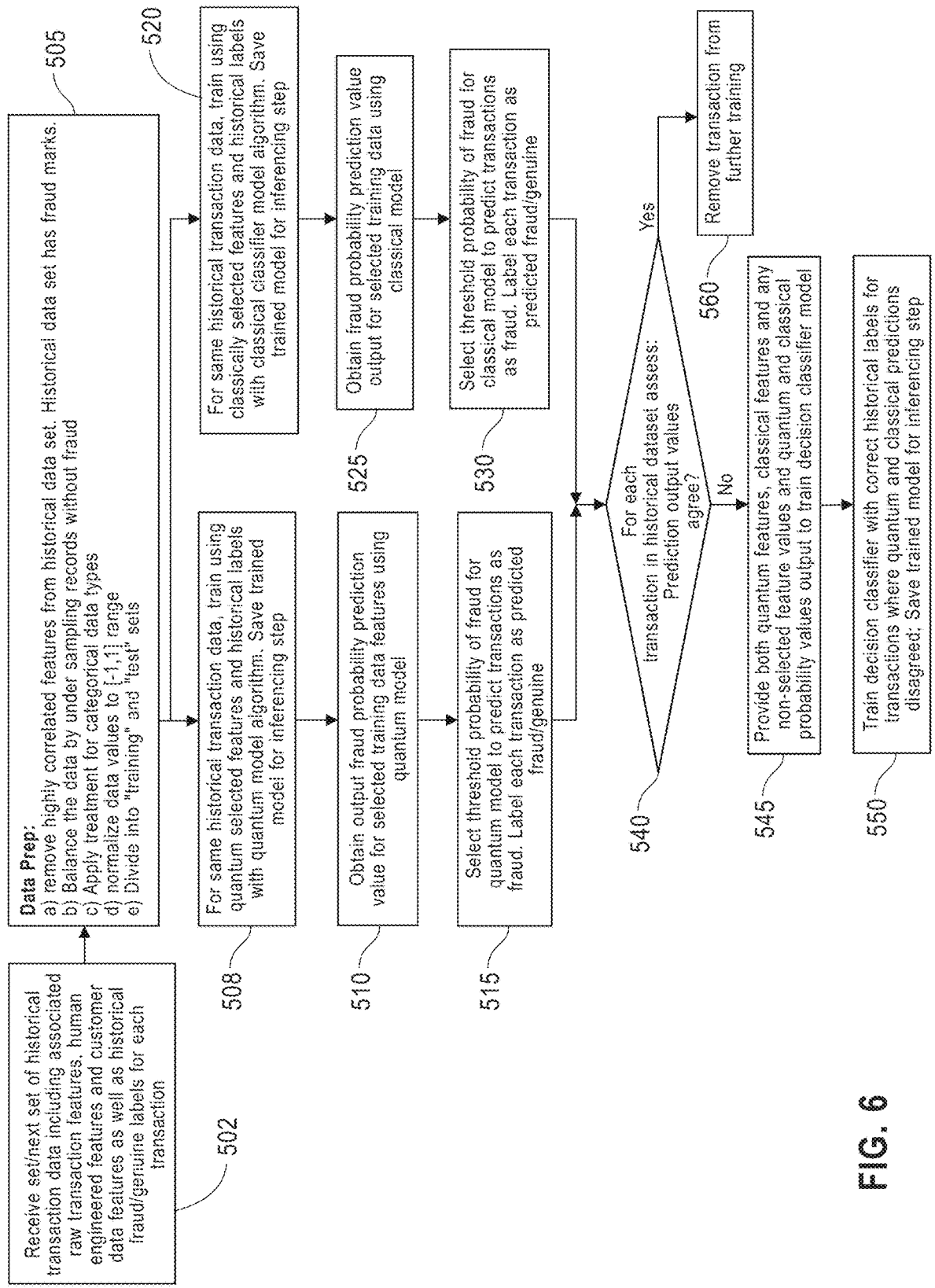
FIG. 6 depicts an iterative process of training the hybrid quantum and classifier ensemble models to make a more accurate fraud transaction prediction in one embodiment.

FIG. 6 depicts the iterative process 500 of training, in an off-line mode, the hybrid quantum and classifier ensemble models to make a fraud transaction prediction in the system of FIG. 3 in one embodiment. At 502, a first step includes receiving each set (successive sets) of the historical transaction data including associated raw transaction features, human engineered features and customer data features as well as historical fraud/genuine labels for each transaction indicating whether the historical transaction resulted in a genuine or fraudulent determination. A further step 505 is a step for preparing the received transaction including the raw transaction features, human engineered features and customer data features for the current historical transaction data set. Then, one or more processes are performed to: a) remove highly correlated features from historical data set. Historical data set has fraud marks; b) balance the data by under sampling records without fraud; c) apply treatment for categorical data types; d) normalize data values to [−1,1] range; and e) divide the data into "training" and "test" sets.

Then, as shown running in parallel, for the same set of historical transaction set, at 508, FIG. 6, the quantum model, e.g., QSVM, is trained using the selected features using the quantum model algorithm and historical labels. This trained model is saved for subsequent fraud prediction inferencing steps. Likewise, and in parallel, at 520, the classic classifier model is trained using a different set of selected features from the same historical transaction as selected using a classic or conventional classifier model algorithm and using historical labels. This trained classical classifier model, e.g., a gradient boosted tree model, is then saved for performing an inferencing step.

Continuing, in parallel, at 510, the system runs processes for generating a fraud prediction probability value for the selected training data features selected using the quantum fraud prediction model and at 525, generates using the classical fraud prediction model a second fraud prediction probability value for those training data features selected.

Continuing, in parallel, at 515, the system runs processes for selecting/updating a threshold probability of fraud for the quantum model to predict transactions as fraud and labeling each transaction as either a predicted fraud/genuine transaction. Similarly, at 530, processes are run for selecting/ updating a threshold probability of fraud for the classical fraud prediction model to predict transactions as fraud and labeling each transaction as either a predicted fraud/genuine transaction.

Continuing at 540, FIG. 5, for a transaction in historical dataset a determination is made as to whether both prediction output values of each model are in agreement or not. If they are in agreement, the process proceeds to 560 to remove that transaction from further training. Otherwise, if both prediction output values of each model are not in agreement, the process proceeds to use the transaction data to train a further decision classifier model, e.g., decision classifier 250 of FIG. 3, and configure it with the ability to predict which model's output value is most correct, i.e., ultimately determine that a corresponding fraud is detected, or a genuine/ valid determination is made for a current transaction. This third decision classifier model is thus trained to arbiter output values that are not in agreement.

Then at 545, FIG. 6, both quantum selected features from the quantum model and classical selected features from the classic classifier model and their respective quantum probability value and classical probability values output, and in addition, any other non-selected feature values, are input to train the decision classifier model. Thus, for example, if there are a total of ten (10) features that can be used to train the models, and the classical classifier model uses selected features 1-3 and the quantum model takes selected features 4-6, then the decision classifier model can use all features 1-10 in addition to the probability score obtained from the classic classifier model and the probability score obtained by the quantum model for a total of 12 features used to train the decision classifier. This training process further include, at 550, providing corresponding correct historical labels for transactions where quantum and classical predictions disagreed. The trained decision classifier model is then stored for subsequent inferencing step if necessary for real-time transaction fraud detection.

As a non-limiting example, given a fraudulent transaction as a probability value of greater than 0.5, if the output of the quantum model is 0.8 and the output for the same transaction using the classic classifier model is 0.4, this indicates a disagreement. Thus, at 545, for the current transaction, the feature attribute values of the selected features used in both models and their corresponding computed probability value scores 0.5, 0.8 are also input to the further trained decision classifier model. This further trained decision classifier model, e.g., model 250 of FIG. 3, has been trained using all features and corresponding genuine or fraudulent transaction labels and in addition, trained on the respective selected transaction features for each model and their corresponding scores, the further trained decision classifier model uses this data to render a decision, i.e., which model output is more correct.

The process of FIG. 6 is run for the whole training set of transactions at the same time to train, in parallel, the quantum and classifier ensemble models and then train the decision classifier model used to determine, for the given transaction, if the quantum model generated fraud prediction or a classic model generated fraud prediction model is more correct.

In a further aspect, the system and methods include building the feature selection using different feature maps and using a quantum property in extracting feature importance, for which there is built a feature forward algorithm, or other state of the art feature selection method that uses quantum kernel estimate.

In an embodiment, there is first initialized and the method starts with a random pair of features, scans through all, selects the one with best performance, and then adds additional feature and iteratively adds new features to ascertain any improvement in a performance metric, e.g., fraud detection accuracy, area under the curve, false positive rate or others. The processing is limited according to a stopping criteria, e.g., when there is no further improvement to a performance metric (such as accuracy) or there are no new features to add.

Figure 7A:
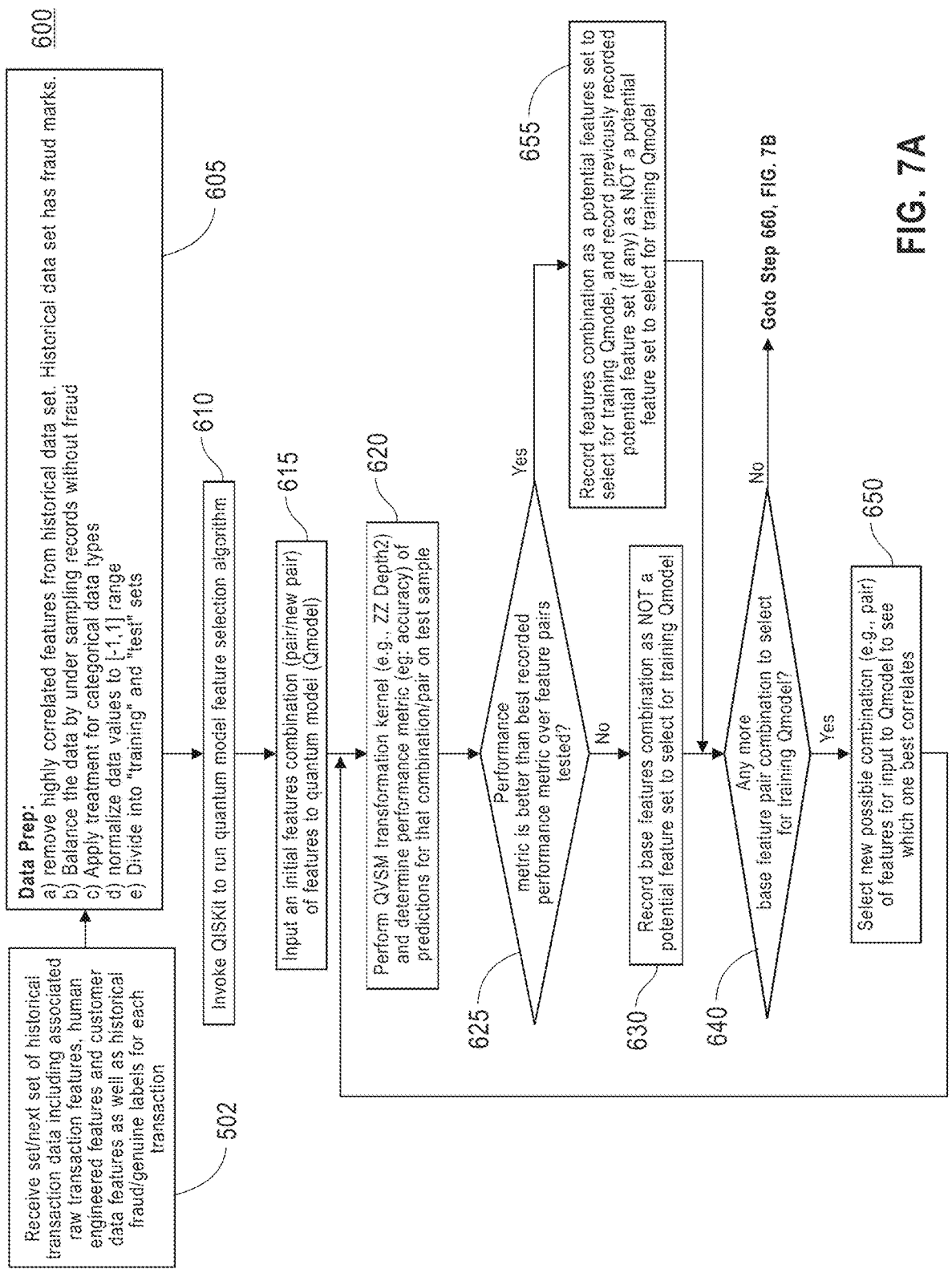
FIGS. 7A and 7B shows a non-limiting example embodiment of an algorithm for the feature selection, in which different feature maps are used and the quantum property is used in extracting feature importance according to an embodiment of the present disclosure.
Figure 7B:
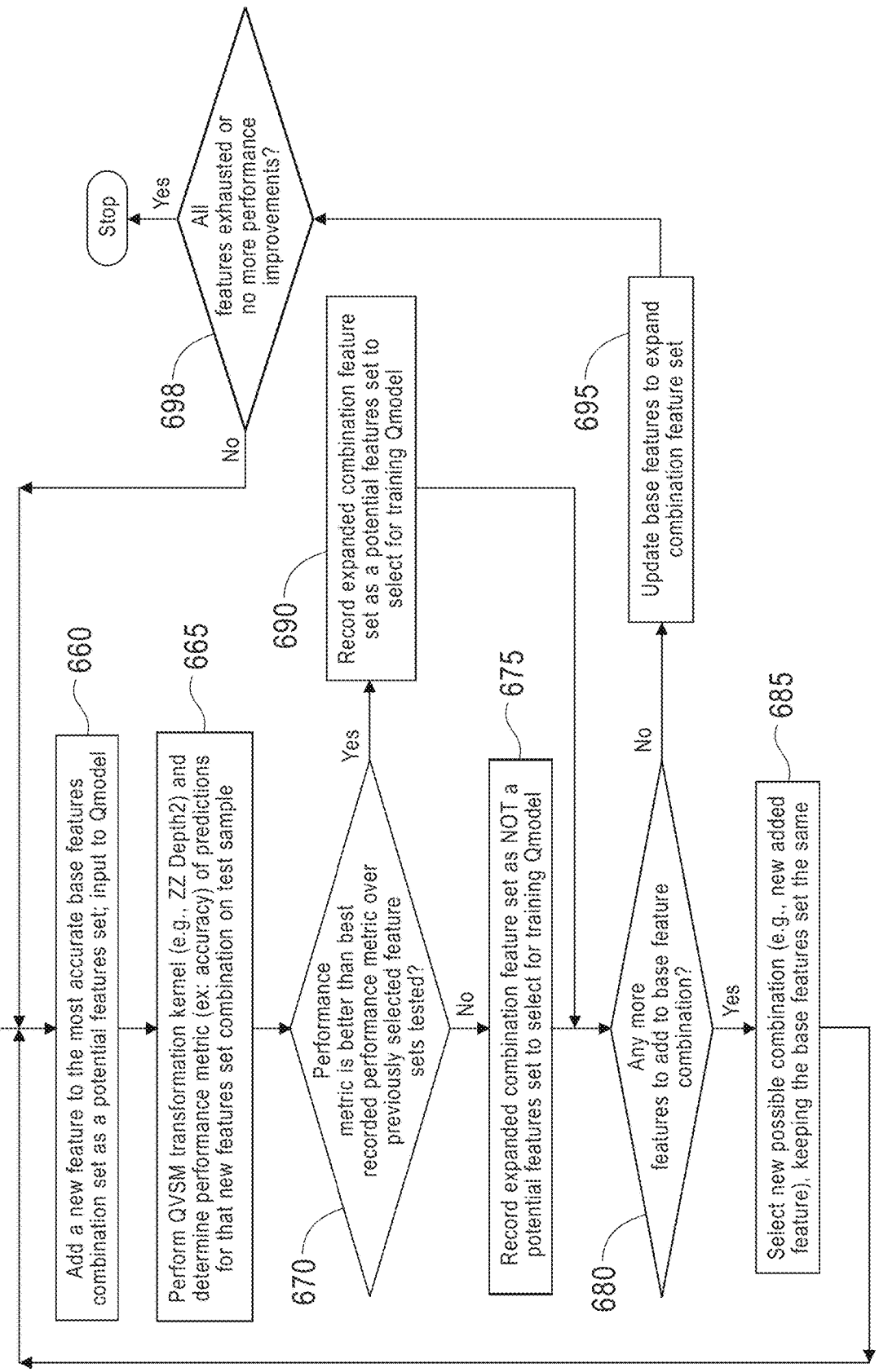

FIGS. 7A and 7B shows a non-limiting example embodiment of an algorithm for the forward feature selection, in which different feature maps may be used and the quantum property is used in extracting feature importance. In an example embodiment, the quantum feature selection algorithm of FIG. 7A-7B is a feed forward selection algorithm however, it is understood that any state of the art feature selection algorithm can be implemented. In an embodiment, the Quantum model 240 is embodied as a feature forward algorithm that uses quantum kernel estimate to select features used for training the quantum model, e.g., a Quantum Support Vector Machine (QSVM) model 240. The quantum algorithm for feature selection it is not restricted to QSVM only, it can be used with any Quantum Model. The quantum model 240 can be a Python coded program using QISKit® package release v0.30.1 or other like computer software for creating quantum computing programs and simulate quantum computing (e.g., QISKit® trademark owned by International Business Machines, Inc.).

At 602, FIG. 7A, the method, in an off-line mode, begins by receiving, at the QSVM QModel algorithm, a training set of historical transactions/features. The received historical transaction data includes associated raw transaction features, human engineered features and customer data features as well as historical fraud/genuine labels for each transaction. Then, at 605, a data preparation procedure is performed to place the data in best form for model processing. Such data preparation techniques include running methods to: a) Remove highly correlated features from historical data set. Historical data set has fraud marks; b) Balance the data by under sampling records without fraud; c) apply treatment for categorical data types; d) normalize data values to [−1,1] range; and e) divide into "training" and "test" sets.

Then, at 610, the method accesses QISKit (or another equivalent quantum programming language) to run the quantum algorithm used in quantum model feature selection algorithm using Python call-outs. Continuing at 615, the method includes inputting an initial features combination (pair/new pair) of features to the quantum model (Qmodel). At 620, routines are invoked for performing QVSM transformation kernel (e.g., ZZ Depth2 feature map) and determine the performance (e.g., accuracy, area under the curve, false positive rate etc.) of a prediction for that combination/pair. In particular, the performance metric (e.g., such as fraud detection accuracy, area under the curve, false positive rate etc.) is determined for the combination/pair on the test sample.

FIG. 9 depicts an example quantum circuit or quantum kernal estimate 800 used for feature selection in an example embodiment. The quantum kernal estimate 800 is an implementation of the QSVM ZZ depth 2 model, however, other quantum circuits employing features of entanglement can be used.

The QSVM kernel estimate circuit 800 takes in all the features and transforms them using mathematical operations into a higher dimensional feature space. It creates a kernel that measures a distance between the different data points in the higher dimensional feature space, groups them and then performs the classification. Testing the method can entail using different feature maps, Z1, Z2, ZZ1, ZZ2, etc. each feature map being a different mathematical operation. In an embodiment, different feature maps including Z1, Z2, ZZ1, ZZ2 are used to transform the feature sets into the higher-dimensional feature space and applies grouping to the features mapping to determine the best feature map.

For example, as shown in FIG. 9, using the ZZ2 feature map, the quantum kernel estimate receives qubits $q_0$, $q_1$ (respective Bloch sphere vector representations of each feature of the feature pair being processed) processes them through respective serially wired quantum gates 801, 802 that act on a respective qubit $q_0$, $q_1$. Quantum gates are analogous to instructions in a classical computing program and the quantum circuit 800 is a representation of a quantum algorithm using quantum gates. For example, in the ZZ2 feature map, a first gate 810, 812 performs respective qubit rotations, e.g., respective Hadamard transformations, and respective second gates 820, 822 perform respective rotations of the respective qubits in their respective Hilbert space based on their respective data values (i.e., feature values). The use of two CNOT gates 824 with a Z rotation 826 performed in between provides a two qubit operation that performs the entanglement and renders the state of one qubit dependent upon the state of the other qubit. The quantum kernel estimate processing circuit 825 including the first and second gates and including the CNOT 824 and Z rotation processing block 826 is repeated at 850 thus rendering the ZZ feature map at depth 2.

In an embodiment, the quantum feature selection process depends upon the quantum model used. While different types of features maps exploiting entanglement property can be implemented, an implementation uses the ZZ model feature map at depth 2 such as shown in FIG. 9 and for that feature mapping, rotations are selected based on which features work the best. The kernel feature estimate is a matrix having the number of rows equal to the number of training transactions and a number of columns equal to the number of training transactions. For each element, e.g., element 1,2, will look at transaction 1 compared to transaction 2. Each transaction is associated with a respective circuit, with each circuit dependent upon the features of that transaction. The circuit rotates and entangles the qubits. Thus, for comparing transaction 1 with transaction 2, the qubit is rotated according to the features of transaction 1 and then unrotate according to the features of transaction 2 and determine a resulting distance from zero (0) as the quantum kernel estimate, i.e., a measure of the distance between the two transactions. Each set of features is associated with a distance measurement, so a set of features is chosen having a distance that provides the best classification. The quantum entanglement property provides a level of correlation between the chosen features. The base pair of features are selected based on the best level of correlation after cycling through all possible combination of feature pairs. The quantum kernel is used to determine the level of feature correlation such that best features are extracted based upon a best distance to a separation line between a fraudulent and genuine transaction. This distance is one performance metric, e.g., the discriminator indicating the accuracy of detection (fraud vs. genuine transaction), that can be used in the feature selection process. Data similarity is implicitly encoded with kernel functions. These functions calculate the optimal line separating two clusters of data by computing similarity between points. The algorithm finds the line giving the smallest generalization error, or fewest incorrect classifications on test data. One can use different statistic measures of classifier performance: accuracy (total number of correctly predicted records/total number or records), hit rate (total number of predicted fraud/total actual fraudulent transactions), etc.—typically derived from a confusion matrix.

Returning back to FIG. 7A, at 625, a determination is then made as to whether the performance metric is better than best recorded performance metric over all the feature pairs tested, e.g., the performance metric of the current predicted fraud score values for these base pair of features is above the best value of the performance metric so far recorded for other pairs. (For example, the accuracy or false positive rate or area under the curve associated with the fraud score values predicted by the model for the testing batch of transactions is higher than that recorded for other pairs of features). If it is determined at 625 that the performance metric (e.g., fraud detection accuracy) for the current base pair of features is better than best recorded performance metric over all the feature pairs tested so far, then the process proceeds to 655 where this base features combination is recorded (and saved) as a potential features set to select for training Modal and, and all the previously recorded potential feature set (if any) becomes NOT a potential feature set to select for training Qmodel. Then the process proceeds to step 640, FIG. 7A. Otherwise, at 625, if it is determined that the performance metric (e.g., fraud detection accuracy) for the current base pair of features is not better than best recorded performance metric over all the feature pairs tested so far, then the process proceeds directly to 630 where the system records this base features combination as NOT a potential feature set to select for training Qmodel and then the process proceeds to step 640.

At 640, FIG. 7A, a further determination is made as to whether there are any further base feature pair combinations to select for training Qmodel. If there are further base feature pair combinations to select for training Qmodel, the process proceeds to 650 to select the new possible combination (e.g., pair) of features and input them into the Qmodel to see which one best correlates and returns to step 620, et seq. to process the new feature combination pair using the quantum model. Otherwise, at 640, if there are no further base feature pair combinations to select for training Qmodel, the process proceeds to step 660, FIG. 7B.

Referring to step 660, FIG. 7B, the programming of the feed forward feature selection algorithm includes adding a new feature to the most accurate base features combination set as a new potential features set, and inputting this new feature input into the Qmodel.

At 665, the method further includes performing the QVSM transformation kernel (e.g., ZZ Depth2), and determining a performance metric (e.g., accuracy) of predictions for that new features set combination on the testing sample.

At 670, a determination is then made as to whether the performance metric is better than best recorded performance metric over previously selected feature sets tested. If at 670, it is determined that the performance metric is better than best recorded performance metric over previously selected feature sets tested, the process proceeds to step 690 where the expanded combination feature set is recorded as a potential features set to select for training Qmodel. Then the process proceeds to step 680. Otherwise, if it is determined at 670 that the performance metric is not better than best recorded performance metric over previously selected feature sets tested, then the process proceeds to 675 for recording the expanded combination feature set as not being a potential features set to select for training the Qmodel. Then the process proceeds to step 680.

At 680, FIG. 7B, a decision is made as to whether there is any more features to add to base feature combination. If there are more features that can be added to base feature combination, the process proceeds to 685 for selecting a new possible combination (e.g., new added feature), keeping the base features set the same. Then the process proceeds back to step 660, et seq. to repeat the steps for inputting the new added feature to the Qmodel and processing the new feature to the most accurate base features combination set as a new potential features set. Otherwise, at 680, if it is determined that are no further features to add to the base feature combination, the process proceeds to 695, FIG. 7B for updating the base features to an expanded combination feature set. A stopping criteria is then applied at step 698 to determine whether all features have been exhausted in the evaluation of the quantum feature set, and/or whether there is no further performance improvement achieved by adding an additional feature, If there are more features to add or further performance improvements is achievable, then the process proceeds back to step 660, for evaluating any new feature that can subsequently be added. Otherwise, the method of FIG. 7A-7B terminates.

Thus, in an example implementation, for the feed forward selection method for the quantum model, there can be 59 total feature attributes that can be used to potentially train the models. However, in an embodiment, the forward feature selection includes picking a pair of all possible pairs of features and the quantum classifier model is run to sees which feature pair gives the best performance metric, e.g., fraud detection accuracy. Then given the best pair, a new (third) feature is added to that pair, and the model is again run with these features (including the third feature) in order to see if the performance metric improves. That is, the method will cycle through all remaining features and incrementally add the third feature to the pair and determine which additional third feature will improve the performance, e.g., increase accuracy, the most. This whole process is then repeated to add a potential subsequent feature, e.g., fourth, fifth or sixth, . . . , fifty ninth feature, to the already obtained features set to see which, if any, additional feature improves model performance the most, e.g., increases accuracy. A stopping criteria is employed to dictate when to stop adding a feature to the quantum classifier model used in the feature selection method to ascertain if model performance improvement results. Such stopping criteria can be when, after cycling through all features, no more performance improvement or insignificant improvement performance results or all 59 features have been exhausted (in this example). As quantum hardware develops to the point where more qubits are available, even on noisy hardware, more features than 59 can be considered.

FIG. 10 depicts a table 900 showing example results showing different features selected 903 depending on the degree of entanglement and structure of the chosen quantum feature map 906, e.g., using Z and ZZ feature maps with respective depths 1 and 2 as an example search. In this example, forward feed feature selection is based on an accuracy performance metric 908 as a discriminator for selecting best features. Other performance metrics can be used. First column 902 depicts the starting best two (2) features obtained using the respective different quantum feature map, e.g., maps QSVM(Z) depth 1, maps QSVM(Z) depth 2, maps QSVM(ZZ) depth 1, and maps QSVM(ZZ) depth 2 and the resulting accuracy as shown in the adjacent column 908. The table records results of scanning the full feature space and incrementally adding next best feature and corresponding accuracy scores corresponding to the feature map. As shown in Table 900, FIG. 10, using the QSVM ZZ depth 2 feature map, where quantum property of entanglement is used, has produced the most accurate results for the example feature attributes added. That is, for each new best feature added to the base pair, e.g., Best Feature 3, Best Feature 4, . . . , Best Feature 7, for each respective feature map used, a corresponding highest accuracy value resulted from use of the features used with the QSVM ZZ depth 2 feature map.

FIG. 11 shows example results showing different features are selected depending on the degree of entanglement and structure of the chosen quantum feature map. In FIG. 11, there is shown: example top seven feature selection results 950 based on the tabulated transaction feature data used with the example QSVM(ZZ) depth 2 feature map; example results 952 based on the transaction features used with the example QSVM(ZZ) depth 1 feature map; example results 956 based on the transaction features used with the example QSVM(Z) depth 2 feature map; and example results 958 based on the transaction features used with the example QSVM(Z) depth 1 feature map. As shown in FIG. 10, QSVM(ZZ) depth 2 feature map where quantum property of entanglement is used results had the best accuracy outcome with a score of 0.789.

As an example, using the XGBOOST classic classifier model 230 with features selected using random forest method, an example accuracy is about: 77.7%, std=0.5%), while the QSVM ZZ quantum model with Depth2 produced an accuracy for the same transaction at 78.8% at Std=0.1%. The performance using both models results in a Mixed Accuracy=79.9%, std 0.7% indicating that the use of the additional QSVM ZZ quantum model with Depth2 boosts the performance of the classic XGBoost classifier model by an additional 1-2 percent.

Such a computing system platform 300 of FIG. 5 provides a platform for real-time monitoring of payment transactions with AI machine-learning models and further quantum algorithm such as a Quantum Support Vector Machine (QSVM) model that provides the tools to stop instances of fraudulent transactions, i.e., limiting both false positives and false negatives.

The performance metrics relevant to fraud prevention are Hit Rate and False Positives, which are strongly interconnected. The aim is to get perfect hit rate (100%) with zero false alarms. The accuracy metric is a global number accounts for the accuracy of predicted class.

For a current transaction, the hybrid classical-quantum computing system approach for evaluating real-time fraudulent transaction improves the ability to stop instances of fraudulent transactions, i.e., limiting instances of both false positives and false negatives.

Figure 8:
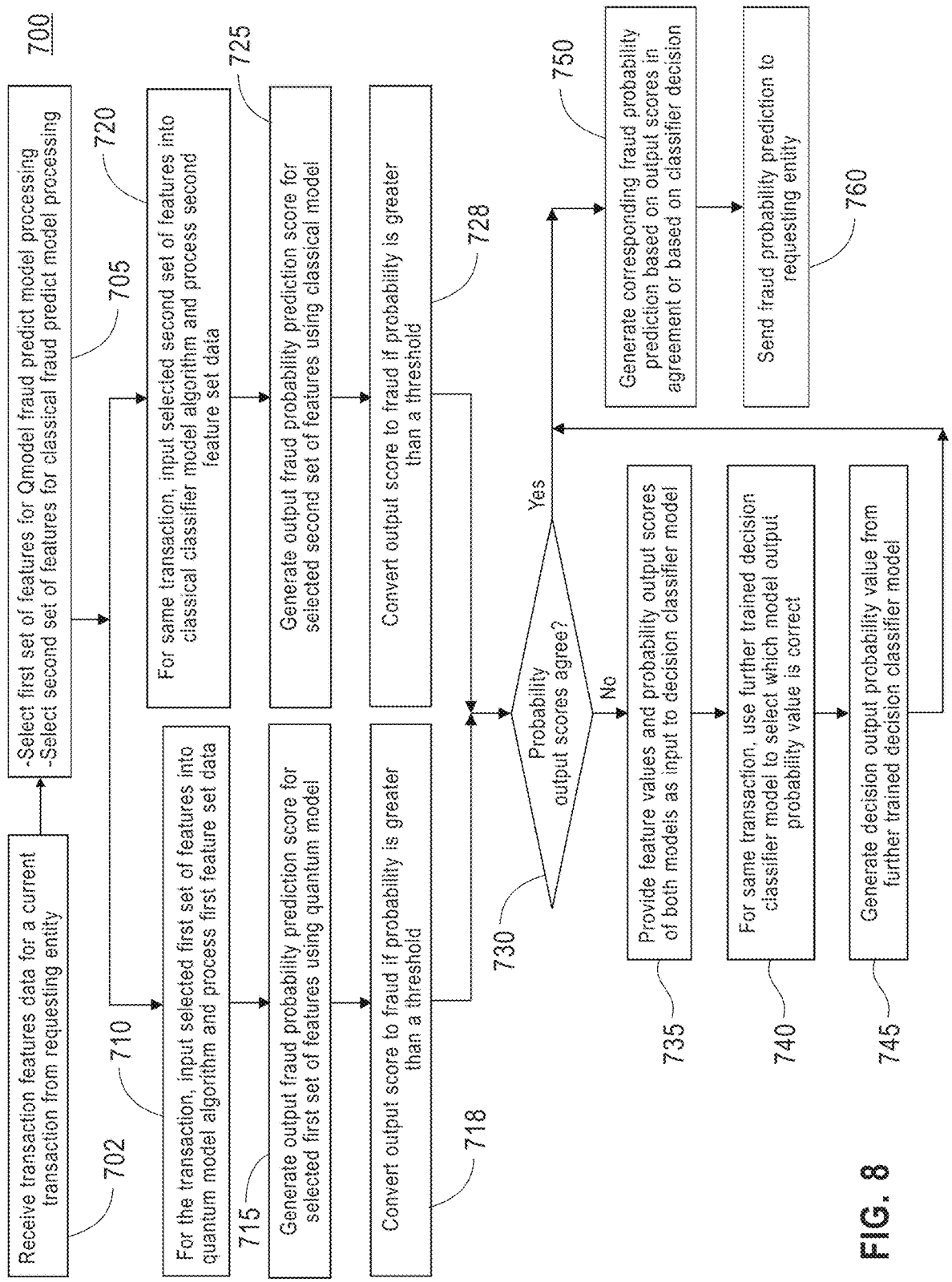
FIG. 8 is an exemplary flowchart in accordance with one embodiment illustrating and describing a method of real-time fraud detection using hybrid classical-quantum ensemble methods for fraud detection with quantum feature selection.

FIG. 8 is an exemplary flowchart in accordance with one embodiment illustrating and describing an on-line method 700 of real-time fraud detection using mixed quantum-classical method for fraud detection with quantum feature selection. While the method 700 is described for the sake of convenience and not with an intent of limiting the disclosure as comprising a series and/or a number of steps, it is to be understood that the process 700 does not need to be performed as a series of steps and that the quantum and classical classifiers may be trained in series or in parallel, for example.

The method 700 in one or more embodiments includes a transaction analytics pipeline including receiving, over a data network, data received from a requesting entity, e.g., a bank or card issuing authority, associated with a current transaction. This data received include data attributes associated with the transaction, e.g., data associated with a card payment at a point-of-sale terminal. In an aspect, the mixed quantum-classical method for fraud detection processes the received data attributes to predict any suspicious or fraudulent activity with regard to the payment transaction. In response to detecting a suspicious or fraudulent activity, the system generates an alert. The method 700 includes in an embodiment at 702 receiving the data used in the analytics pipeline—including current transaction attributes data including but not limited to: transaction amount, card issuer ID, card number, credit line, merchant category code, merchant ID, Point-of-sale entry mode, etc . . .

At 705, FIG. 8, a first data set of features is selected for input to a quantum model that is trained to generate a score used to predict a potential fraud activity based on the first set features. This set of features have been prior selected by the feed forward algorithm that uses quantum kernel estimate using different feature maps to select features of importance according to a quantum property, entanglement, e.g., by the feed forward algorithm implementing a supervised variational quantum classifier which sees different relationships among the features due to entanglement properties.

Further, at 705, a second data set of features is selected for input to a classical fraud prediction model, e.g., a conventional classifier model trained to generate a score used to predict a potential fraud activity based on the second set features.

As shown in FIG. 8, steps are performed the current transaction to input, in parallel, at 710, the received first data set of features to the quantum computing system or a computing system running a quantum computer simulator running the trained quantum classifier model (e.g., QSVM model 240 of FIG. 3), and at 720, input the received second set of features to the further computing system running the trained conventional classifier model (e.g., conventional classifier model 230 of FIG. 3).

In an embodiment, step 710 includes configuring the quantum model to use feature attributes selected from a QSVM quantum model or supervised variational quantum classifier which has determined different relationships among the features due to entanglement properties and quantum model is configured to use feature attributes selected from a QSVM quantum model or supervised variational quantum classifier which has seen different relationships among the features due to entanglement properties; and at 720, configuring the classical model to use feature attributes selected from the classic classifier model (e.g., using a gradient boosted tree or random forest model). Both classical and quantum type models are used to exploit their complementary properties, and both enhance performance in detecting true instances of fraud and minimizing occurrence of false positives.

Then, functioning in parallel, at 715, the quantum computer simulator running the trained quantum classifier model processes the first set of features and generates an output fraud probability prediction score based on the selected first set of features and at 725, the first computing system running the trained classical classifier model the second set of features and generates an output fraud probability prediction score based on the selected second set of features. Finally, in parallel, at 718 and 728, the quantum computer simulator or further computer system converts the fraud probability prediction scores output by the respective quantum classifier model and the conventional classifier into a respective determination of a fraud, e.g., by a comparing of each fraud probability prediction score against a pre-determined threshold value. For example, if both fraud probability prediction scores output exceeds a pre-determined threshold value, this can be a determination of a potential fraud activity, and if both fraud probability prediction scores output do not exceed the pre-determined threshold value, this can be a determination of a valid transaction.

Continuing to 730, FIG. 8, a determination is made as to whether the output probability scores agree, i.e., if both model's output scores render both models either in agreement as to a fraudulent detection or valid not. For example, both output scores can be processed by one of the computing systems that the fraud prediction models are run for comparison against a predetermined threshold value, e.g., 0.5. If it is determined, at step 730, that both output scores are greater than the example predetermined threshold value of 0.5 this would indicate both fraud prediction models are in agreement about the attempted fraudulent transaction payment and the process would proceed to step 750. Likewise, if both output scores are less than the example predetermined threshold value of 0.5 this would indicate both fraud prediction models are in agreement that the transaction payment is not fraudulent and the process would proceed to step 750.

At 750, FIG. 8, the computer system generates a corresponding fraud prediction according to the agreement based on the comparisons of the generated scores against the pre-determined threshold. Then, at 760, the computing system generates a signal indicating the determined fraud prediction or validation based on the determined agreement of the model's generated output scores for the current transaction (i.e., either both scores above threshold value indicating attempted fraud activity or both scores below threshold value indicating not fraudulent). At 760, FIG. 8, this generated signal indicating the prediction is sent to back to requesting entity over a data network for real-time transaction approval or transaction disapproval.

Returning back to 730, FIG. 8, if it is determined that the output probability scores are not in agreement, i.e., one output probability score is determined as above the predetermined threshold value which indicates either a potential fraudulent payment (e.g., above the threshold value such as 0.5) and the other output probability score is determined below the predetermined threshold value which indicates no potential fraudulent payment, then the process continues to 735 where the feature values and probability output scores are input to a further decision classifier model (e.g., decision classifier model 250 of FIG. 3). This decision classifier model is trained to render a decision as to the correctness of each of the individual models' predictions for that current transaction, i.e., which model—either the quantum computing model providing first score or the classical classifier model providing the second score—is more accurate or correct.

Thus, at step 735, either at the same computing system that runs the classical classifier model, or a different computing system, a third classification model, e.g., a logistic regression model, is configured to receive both the first set of feature values and probability output score computed by the first classical classifier model and in addition receive both the second set of feature values and probability output score computed by the second quantum model as input to decision classifier model. The trained classifier model is then run at 740, FIG. 8 to decide and select which model output probability value is correct and at 745 generates a decision output probability value. The process continues to 750, FIG. 8 where the computer system generates a corresponding signal indicating the prediction based on the determined decision (i.e., based on the third classifier model classification based on both selected sets of input transaction feature attributes and their corresponding scores in disagreement. Such a signal indicates an attempted fraud activity or non-fraudulent based upon the decision. At 760, FIG. 8, this generated signal indicating the prediction is sent to back to requesting entity such that the transaction can be correspondingly approved or prevented.

It is expected that the accuracy of the QSVM algorithm improves as more features are able to be handled by the hardware, due to the quantum computing properties: superposition and entanglement. In the long term when there are more qubits available on hardware, the QSVM with more features can be combined in the ensemble with the classical methods (for example XGBoost) to further improve performance. This should further improve performance of fraud prediction.

In an embodiment, the Quantum model and quantum kernel estimate algorithm can run on a Quantum Machine accessible via the cloud. FIG. 12 shows an example Quantum computer 1000 within which the Quantum model and quantum kernel estimate can run in an embodiment. The Quantum computer 1000 is based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

In FIG. 12, a host computing system 1005 hosts instructions for the user to formulate the feature maps as quantum algorithms using a high-level quantum programming language such as provided by the QISKit package. The Quantum algorithms apply quantum operations (quantum gates) on subsets of qubits. From the host computing system 1005, via the QISKit package, the current feature map job for model feature selection is sent as instructions over a network, e.g., a cloud, where they are queued. Signals 1010 embodying qubits (representing the transaction feature attributes) and instruction signals are then sent to a control/measurement computer 1015. A series of microwave electronics 1025 mix the received signals 1010 down to a frequency that can be digitized. Measurements and control pulses flow down coaxial cable lines in descending levels of a dilution refrigerator 1030 that is cooled to very low temperatures. To minimize energy loss, the coaxial lines directing signals are made of superconductors. A quantum processor chip (not shown) rests at the bottom at a small temperature above absolute zero and is shielded to protect it from electromagnetic radiation. Measurement pulses interact with qubits via readout resonators 1035 and the result signals 1011 are reflected back. In particular, quantum processor chip uses a fixed-frequency, superconducting, Josephson-junction-based transmon qubits. A qubit of this type is essentially an LC resonator—a capacitor and an inductor connected in series. The inductor is the Josephson junction—a pair of superconducting electrodes that are separated by a very thin insulator. The Josephson junction creates the nonlinearity that enables the LC resonator to act like an atom with two quantum energy levels: |0) and |1). Microwave control pulses manipulate the qubit between these two states to carry out quantum operations. To determine the result of a qubit's operation, a measurement signal is sent as a microwave pulse to the qubit's resonator. The measurement destroys the qubit's superposition and collapses the qubit's state to 0 or 1.

The measurement pulses are routed by circulators, and cryogenic isolators prevent noise from getting to the qubits. The reflected back signals 1011 travel back up the dilution refrigerator 1030, passing through isolators that protect the qubits from noise as well as passing through a series of amplifying stages that boost the signal's strength enough to read the qubit's state accurately. The signal then passes back through the stack of microwave electronics, this time to be converted from microwave frequency to a digital signal by the control/measurement computer 1015 and the result is classified as a logic 0 or a logic 1 which results can be sent back to a user, e.g., over a network connection to a local computer to display the result of the quantum calculation.

Figure 13:
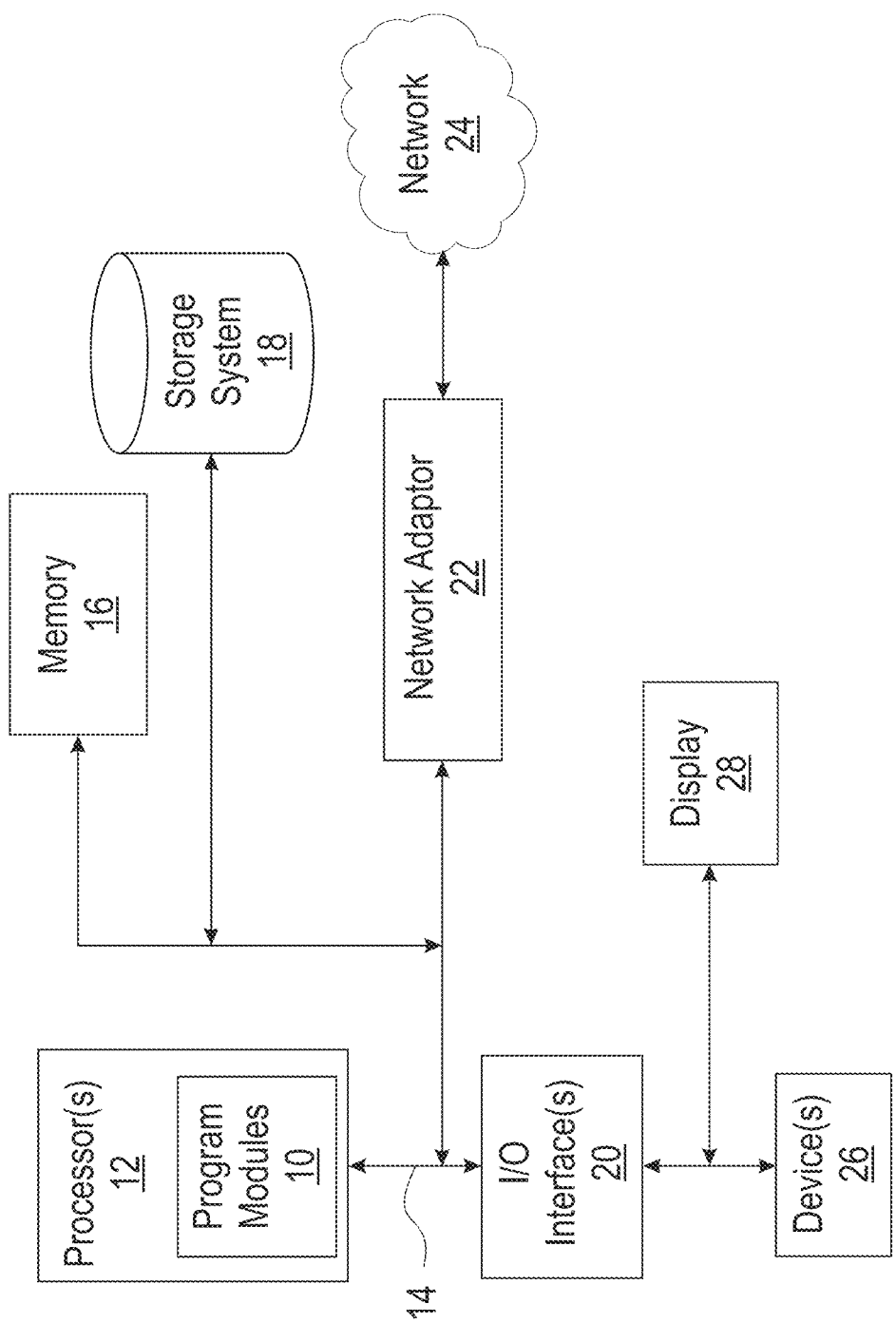
FIG. 13 illustrates yet another exemplary system in accordance with the present disclosure.

FIG. 13 illustrates an example classical computing system for use according to aspects of the present invention. It is to be understood that the computer system depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 13 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the present invention.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by the computer system, and it may include both volatile and non-volatile media, removable and non-removable media.

Memory 16 (sometimes referred to as system memory) can include computer readable media in the form of volatile memory, such as random-access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of detecting fraudulent transactions comprising:
receiving, at a first computing system running a first fraudulent transaction prediction model, a first set of attributes associated with a current payment transaction, said first fraudulent transaction prediction model trained using historical transaction data to detect a fraudulent transaction based on a first set of features identified as most indicative of a potential fraudulent transaction;
generating, at said first computing system, a first output score from said first fraudulent transaction prediction model;
running, at a quantum computing system or quantum computer simulator, a feed forward feature selector quantum computer algorithm implementing a quantum kernel estimate for feature selection, said quantum kernel estimate transforming, using different feature maps employing a quantum entanglement property, a set of features into a higher dimensional feature space and selecting a different set of features depending upon a degree of entanglement for extracting feature importance;
receiving, at the quantum computing system or quantum computer simulator running a second quantum-based fraudulent transaction prediction model, a second set of attributes associated with said current payment transaction, said second fraudulent transaction prediction model trained to detect using said historical transaction data a fraudulent transaction based on a selected different set of features identified as most indicative of a potential fraudulent transaction;
generating, by said quantum computing system or quantum computer simulator, a second output score from said second fraudulent transaction prediction model;
comparing, at said first computing system, said generated first output score and said generated second output score;
determining, based on said comparison, whether the generated first output score and second output score indicate an agreement as to a fraudulent current payment transaction or a valid transaction;
responsive to determining that the first generated output score and the second generated output score are not in agreement, inputting said first set of attributes or a subset thereof and said first generated output score, said second set of attributes or a subset thereof and said second generated output score to a third prediction model run at the first computing system, said third prediction model trained to determine a correctness of either said first fraudulent transaction prediction model based on the first output score or said second second quantum based fraudulent transaction prediction model based on the second output score;
outputting, by said third prediction model, a decision based on said determined correctness, and a generated final prediction score and
generating, at the first computing system, an alert signal when said decision indicates a potential fraudulent current payment transaction.

2. The computer-implemented method as claimed in claim 1, wherein a training of said second quantum-based fraudulent transaction prediction model comprises:
configuring, at said quantum computing system or a quantum computer simulator, the feed forward selector quantum computing algorithm to receive each different set of features and associated supervising labels corresponding to historical payment transactions,
computing a performance metric used to evaluate model performance based on each said received different set of features; and
selecting a features set for subsequent use by the second prediction model based on the computed performance metric.

3. The computer-implemented method as claimed in claim 2, wherein said performance metric comprises: an accuracy of fraudulent transaction prediction by the feed forward selector quantum computing algorithm using the selected features, said method further comprising:

choosing said second set of attributes corresponding to a set of said selected features that produce the most accurate prediction by the feed forward selector quantum computing algorithm.

4. The computer-implemented method as claimed in claim 3, wherein said running said feed forward selector quantum computing algorithm comprises:
selecting a pair of features for input to said feed forward quantum computing algorithm; and
processing, using a quantum circuit implementing said feed forward quantum computing algorithm, qubits associated with said selected feature pair through a selected feature mapping to determine a fraudulent transaction prediction score based on said selected pair of features by training a quantum algorithm using the selected feature pair and feature mapping; and
repeating, for all combination of feature pairs, said feature pair selecting and associated qubit processing by said quantum circuit and saki quantum algorithm training to determine the pair that leads to the most accurate fraudulent transaction prediction score.

5. The computer-implemented method as claimed in claim 4, further comprising:
adding an additional feature to said selected feature pair providing said most accurate fraudulent transaction prediction score; and
processing, using the quantum circuit, qubits associated with said selected feature pair and said additional feature to determine a further fraudulent transaction prediction score and estimate of the accuracy of these predictions across a set of transactions;
selecting a third feature that leads to the most accurate predictions across the set of transactions;
incrementally adding a different selected feature to said selected feature pair and repeating, for each incrementally added third feature to the selected feature pair, said associated qubit processing by said quantum circuit to determine the most accurate fraudulent transaction prediction score for said feature pair and additional feature combination, and
stopping the incremental adding of different selected features when no further improvement in performance metric is observed.

6. The computer-implemented method as claimed in claim 5, wherein said feed forward quantum computing algorithm is used with a quantum machine learning model, said quantum machine learning model comprising a quantum support vector machine.

7. The computer-implemented method as claimed in claim 6, wherein said quantum support vector machine implements a feature map invoking entanglement.

8. The computer-implemented method as claimed in claim 1, wherein said third prediction model further receives one or more additional non-selected attributes associated with said current payment transaction.

9. A system for detecting fraudulent transactions comprising:
a first fraudulent transaction prediction model trained using historical transaction data to detect a fraudulent transaction based on a first set of features identified as most indicative of a potential fraudulent transaction, said first prediction model configured to receive a first set of attributes associated with a current payment transaction;
a first computing system running said first fraudulent transaction prediction model with said first set of attributes to generate a first output score;
run, at a quantum computing system or quantum computer simulator, a feed forward feature selector quantum computer algorithm implementing a quantum kernel estimate for feature selection, said quantum kernel estimate transforming, using different feature maps employing a quantum entanglement property, a set of features into a higher dimensional feature space and selecting a different set of features depending upon a degree of entanglement for extracting feature importance;
a second quantum-based fraudulent transaction prediction model trained to detect using said historical transaction data a fraudulent transaction based on a selected different set of features identified as most indicative of a potential fraudulent transaction, said second quantum based fraudulent transaction prediction model configured to receive a second set of attributes associated with a current payment transaction;
the quantum computing system or quantum computer simulator running said second prediction model with said second set of attributes to generate a second output score;
a hardware processor, associated with said first computing system, said hardware processor configured to:
receive said generated first output score and said generated second output score;
compare, said generated first output score and said generated second output score:
determine, based on said comparison, whether the generated first output score and second output score indicate an agreement as to a fraudulent current payment transaction or a valid transaction;
responsive to determining that the first generated output score and the second generated output score are not in agreement, input said first set of attributes and said first generated output score, said second set of attributes and said second generated output score to said first computing system running a third prediction model,
said third prediction model trained to determine a correctness of either said first fraudulent transaction prediction model based on the first output score or said second quantum based fraudulent transaction model based on the second output score;
said first computer system configured to output, by said third prediction model, a decision based on said determined correctness and a generated final prediction score, and
generate, at the first computing system, an alert signal when said decision indicates a potential fraudulent current payment transaction.

10. The system as claimed in claim 9, wherein to train said second prediction model, the quantum computing system or quantum computer simulator is configured to:
configure the feed forward selector quantum computing algorithm to receive each different set of features and associated supervising labels corresponding to historical payment transactions;
compute a performance metric used to evaluate model performance based on each said received different set of features; and
select a features set for subsequent use by the second prediction model based on the computed performance metric, said second set of attributes corresponding to a most accurate set of said selected features.

11. The system as claimed in claim 10, wherein to run said feed forward selector quantum computing algorithm, said quantum computing system or quantum computer simulator is configured to:
- select a pair of features for input to said feed forward quantum computing algorithm; and
- use a quantum circuit implementing said feed forward quantum computing algorithm to process qubits associated with said selected feature pair to determine a fraudulent transaction prediction score based on said selected pair of features; and
- repeat, for all combination of feature pairs, said feature pair selecting and associated qubit processing by said quantum circuit to determine a most accurate fraudulent transaction prediction score for each feature pair combination.

12. The system as claimed in claim 11, wherein to run said feed forward selector quantum computing algorithm, said quantum computing system or quantum computer simulator is further configured to:
- add an additional feature to said selected feature pair providing said most accurate fraudulent transaction prediction score; and
- use the quantum circuit to process qubits associated with said selected feature pair and said additional feature to determine a further fraudulent transaction prediction score;
- incrementally add a different selected feature to said selected feature pair and repeat, for each incrementally added feature to the selected feature pair, said associated qubit processing by said quantum circuit to determine a most accurate fraudulent transaction prediction score for said feature pair and additional feature combination, and
- stop the incremental adding of different selected features when no further improvement in performance metric is observed.

13. The system as claimed in claim 12, wherein said feed forward quantum computing algorithm is a quantum support vector machine.

14. The system as claimed in claim 13, wherein said quantum support vector machine implements a feature map invoking entanglement.

15. A computer program product comprising a non-transitory computer readable medium comprising instructions that, when executed by at least one hardware processor, causes the at least one hardware processor to:
- provide, to a first computing system running a first fraudulent transaction prediction model, a first set of attributes associated with a current payment transaction, said first prediction model trained based on a first set of features identified as most indicative of a potential fraudulent transaction to detect a fraudulent transaction;
- generate, at said first computing system, a first output score from said first prediction model;
- run, at a quantum computing system or quantum computer simulator, a feed forward feature selector quantum computer algorithm implementing a quantum kernel estimate for feature selection, said quantum kernel estimate transforming, using different feature maps employing a quantum entanglement property, a set of features into a higher dimensional feature space and selecting a different set of features depending upon a degree of entanglement for extracting feature importance;
- provide, to a second quantum-based fraudulent transaction prediction model running at the quantum computing system or quantum computer simulator, a second set of attributes associated with said current payment transaction, said second prediction model trained to detect using said historical transaction data a fraudulent transaction based on a selected different set of features identified as most indicative of a potential fraudulent transaction;
- generate, at said quantum computing system or quantum computer simulator, a second output score from said second fraudulent transaction prediction model;
- compare, at said first computing system, said generated first output score and said generated second output score;
- determine, based on said comparison, whether the generated first output score and second output score indicate an agreement as to a fraudulent current payment transaction or a valid transaction;
- responsive to determining that the first generated output score and the second generated output score are not in agreement, input said first set of attributes and said first generated output score, said second set of attributes and said second generated output score to a third prediction model run at the first computing system, said third prediction model trained to determine a correctness of either said first fraudulent transaction prediction model based on the first output score or said quantum based fraudulent transaction prediction model based on the second output score;
- output, by said third prediction model, a decision based on said determined correctness, and a generated final prediction score and
- generate, at the first computing system, an alert signal when said decision indicates a potential fraudulent current payment transaction.

16. The computer program product according to claim 15, wherein to train said second prediction model, said instructions further configure the at least one hardware processor to:
- configure, at said quantum computing system or a quantum computer simulator, the feed forward selector quantum computing algorithm to receive each different set of features and associated supervising labels corresponding to historical payment transactions;
- compute a metric used to evaluate model performance based on each said received different set of features; and
- select a features set for subsequent use by the second prediction model based on the computed performance metric.

17. The computer program product as claimed in claim 16, wherein said performance metric comprises: an accuracy of fraudulent transaction prediction by the feed forward selector quantum computing algorithm using the selected features, wherein said instructions further configure the at least one hardware processor to:
- choose said second set of attributes corresponding to a set of said selected features that produce the most accurate prediction by the feed forward selector quantum computing algorithm.

18. The computer program product as claimed in claim 17, wherein to run said feed forward selector quantum computing algorithm, said instructions further configure the at least one hardware processor to:
- select a pair of features for input to said feed forward quantum computing algorithm; and process, using a quantum circuit implementing said feed forward quantum computing algorithm, qubits associated with said selected feature pair through a selected feature mapping to determine a fraudulent transaction prediction score based on said selected pair of features by training a quantum algorithm using the selected feature pair and feature mapping; and repeat, for all combination of feature pairs, said feature pair selecting and associated qubit processing by said quantum circuit and saki quantum algorithm training to determine the pair that leads to the most accurate fraudulent transaction prediction score.

19. The computer program product as claimed in claim 18, wherein said instructions further configure the at least one hardware processor to:

add an additional feature to said selected feature pair providing said most accurate fraudulent transaction prediction score; and process, using the quantum circuit, qubits associated with said selected feature pair and said additional feature to determine a further fraudulent transaction prediction score and estimate of the accuracy of these predictions across a set of transactions;

select a third feature that leads to the most accurate predictions across the set of transactions;

incrementally add a different selected feature to said selected feature pair and repeating, for each incrementally added third feature to the selected feature pair, said associated qubit processing by said quantum circuit to determine the most accurate fraudulent transaction prediction score for said feature pair and additional feature combination, and stop the incremental adding of different selected features when no further improvement in performance metric is observed.

20. The computer program product according to claim 19, wherein said feed forward quantum computing algorithm is a quantum support vector machine implementing a feature map invoking entanglement.

\* \* \* \* \*